Figure 1:
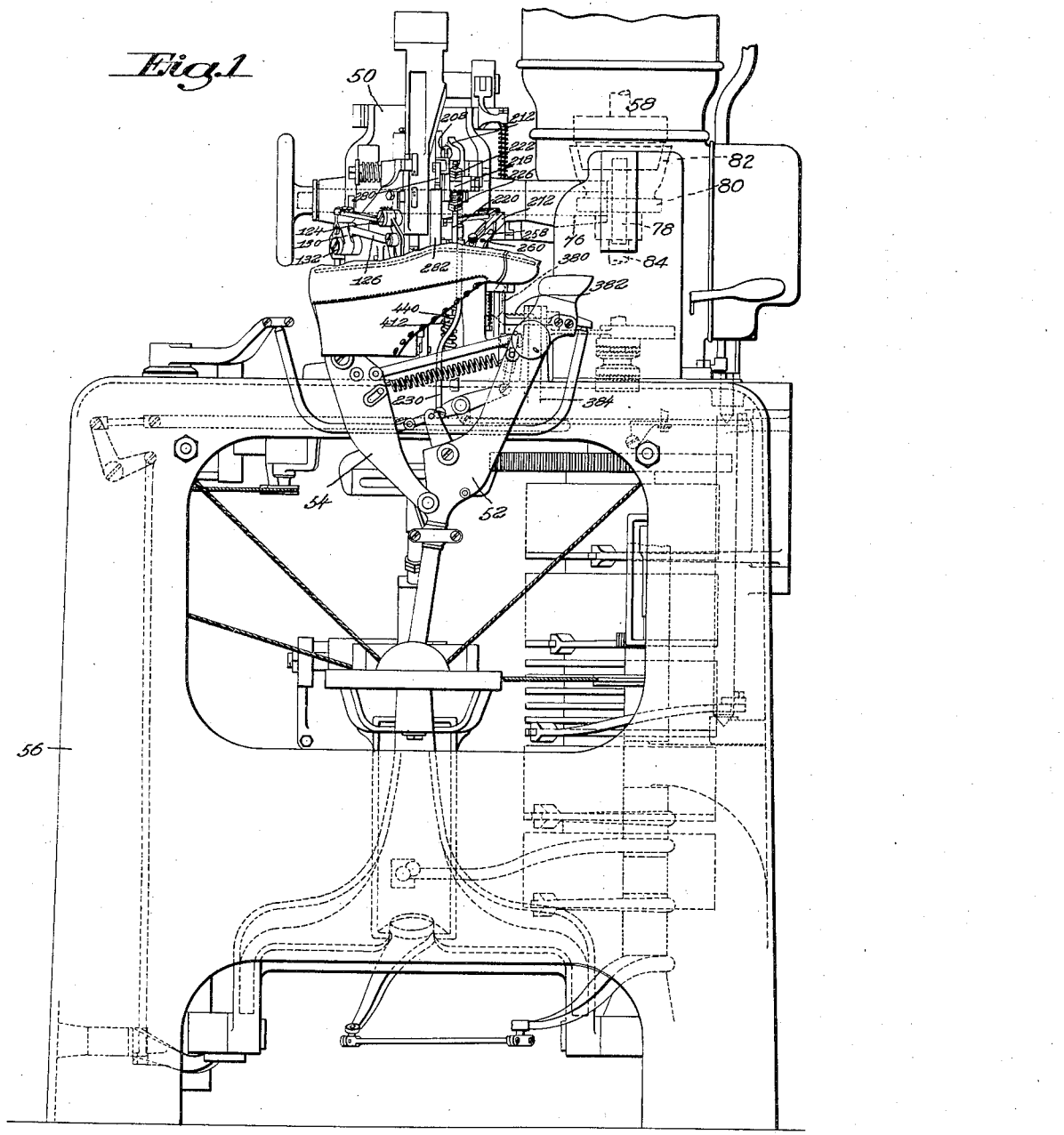

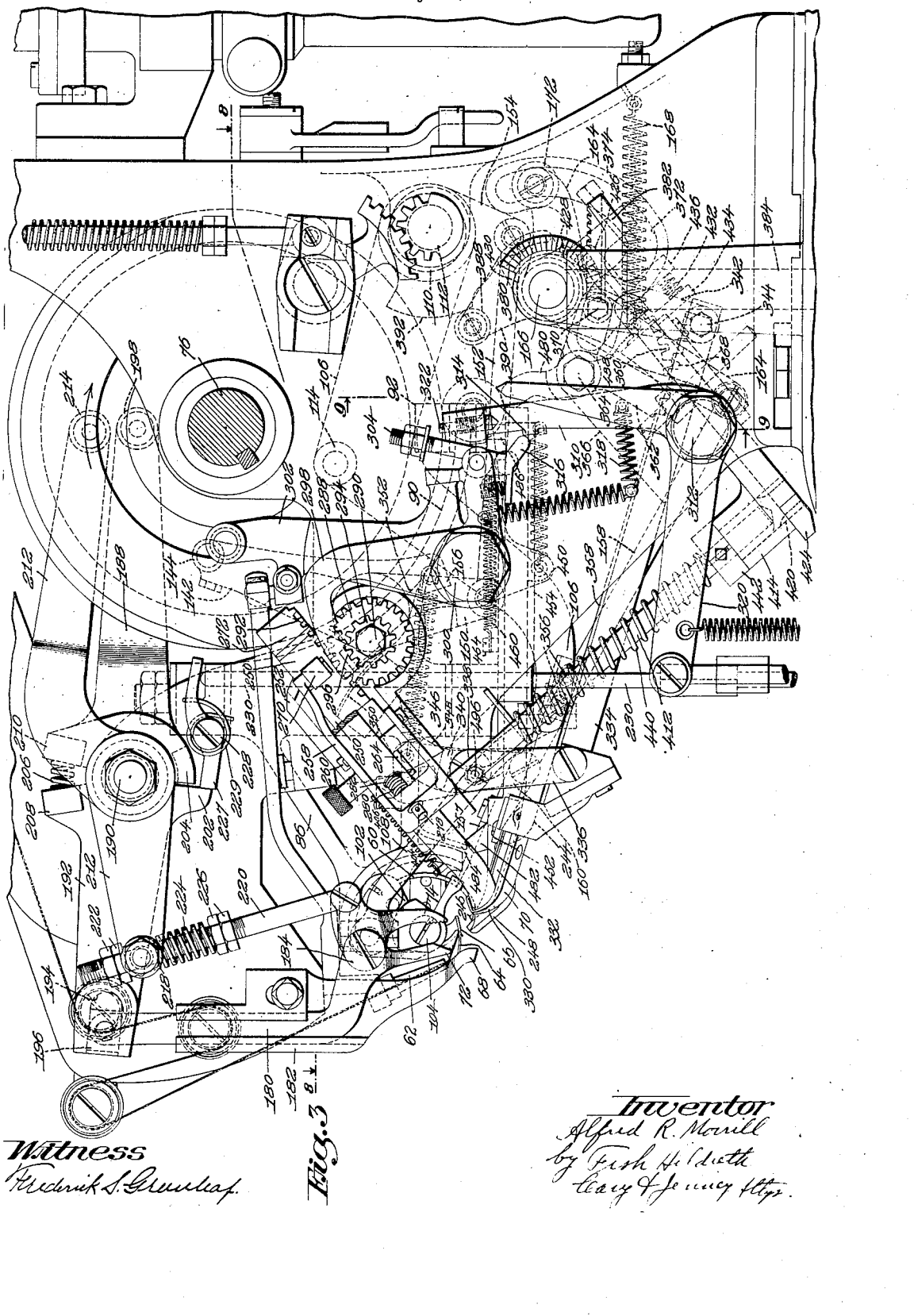

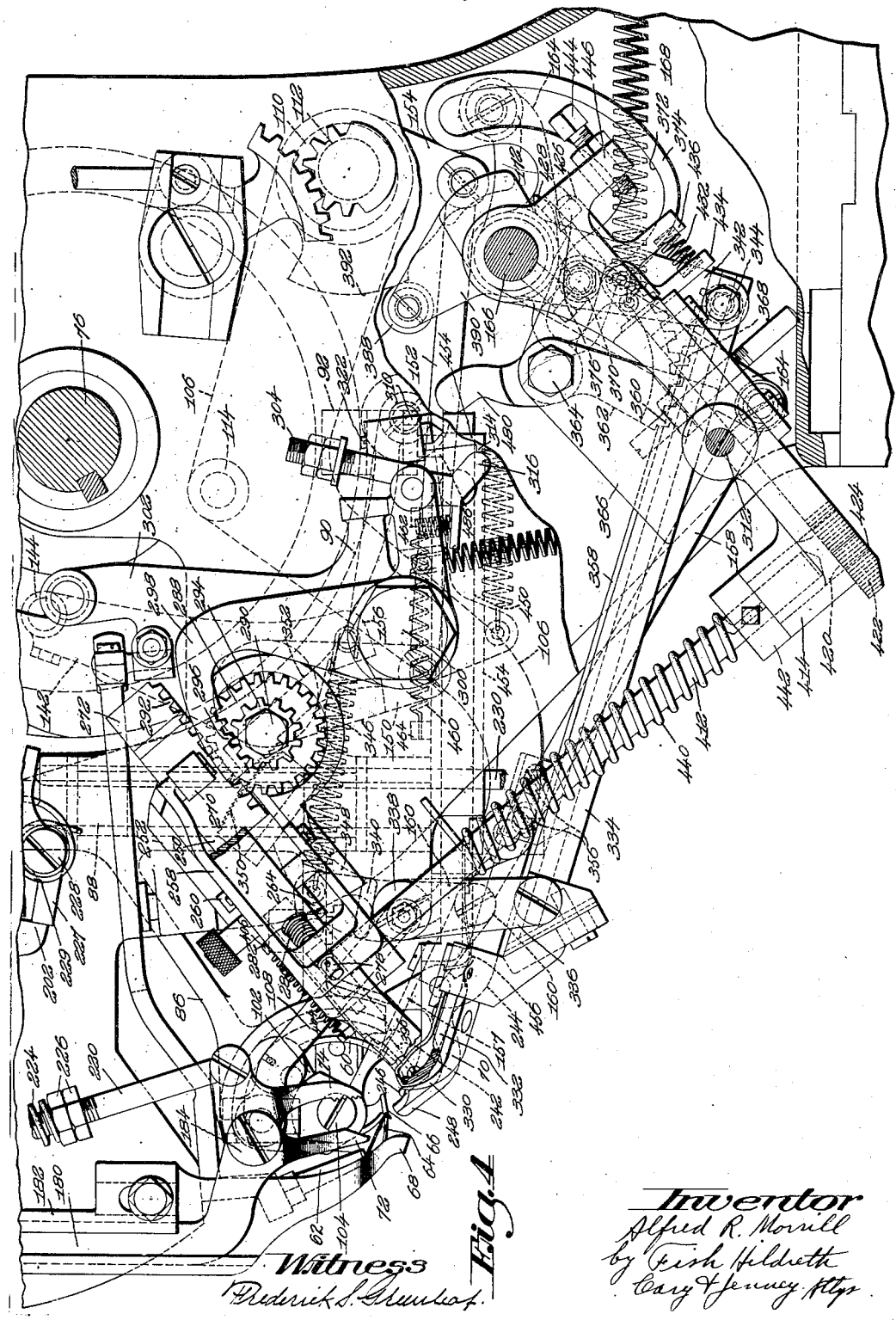

June 13, 1939. A. R. MORRILL 2,162,026
SHOE MACHINE
Filed May 25, 1935 19 Sheets-Sheet 5
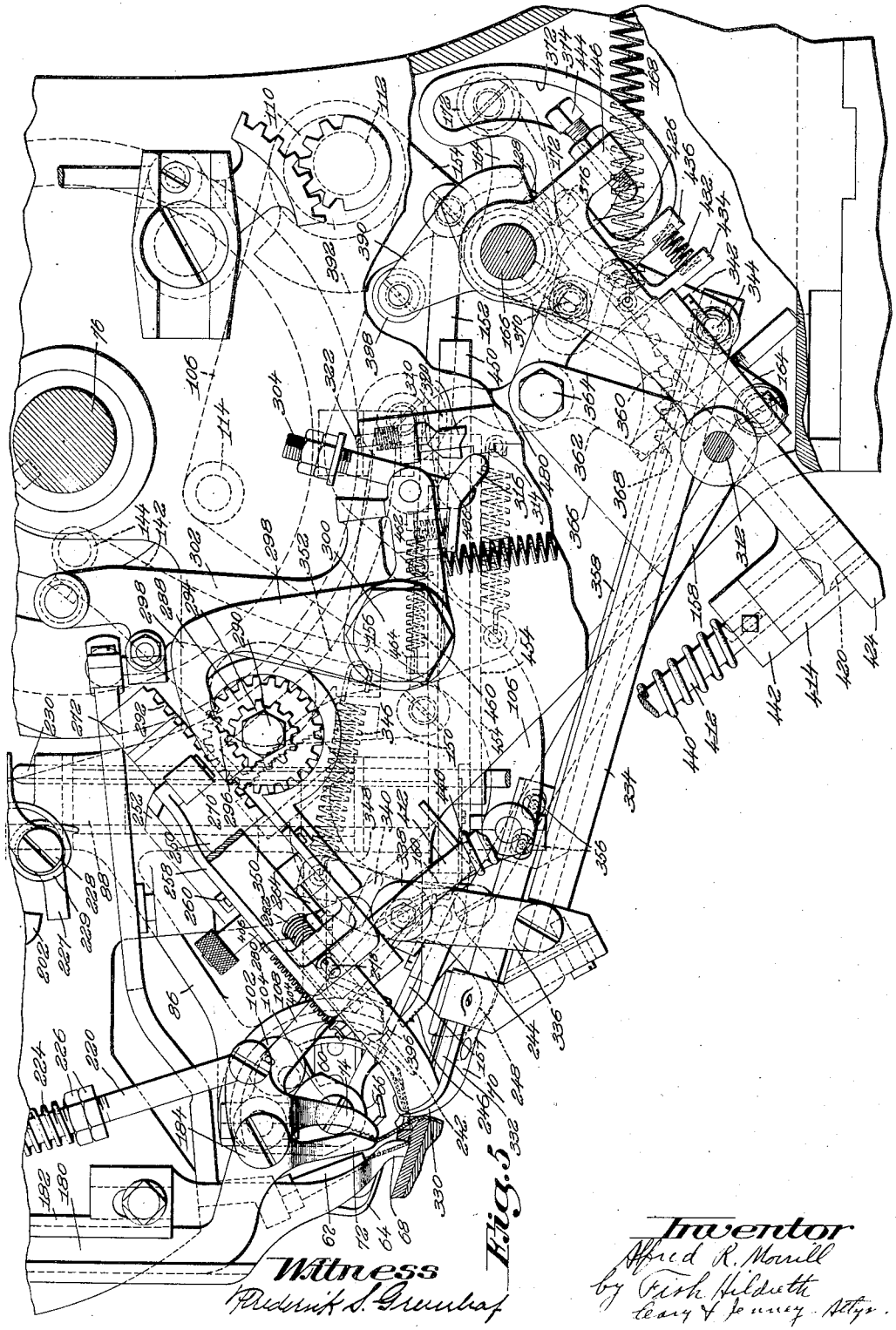

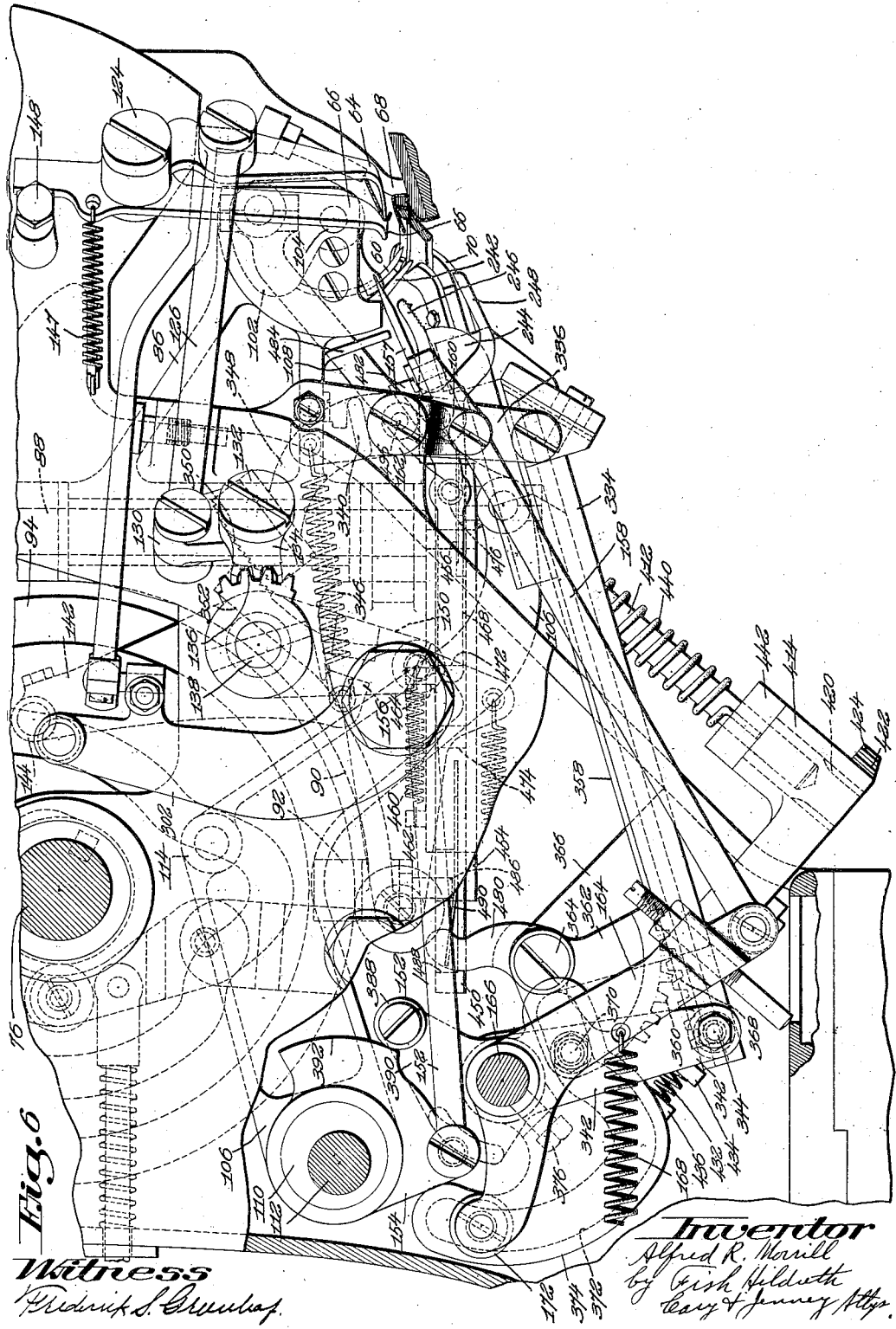

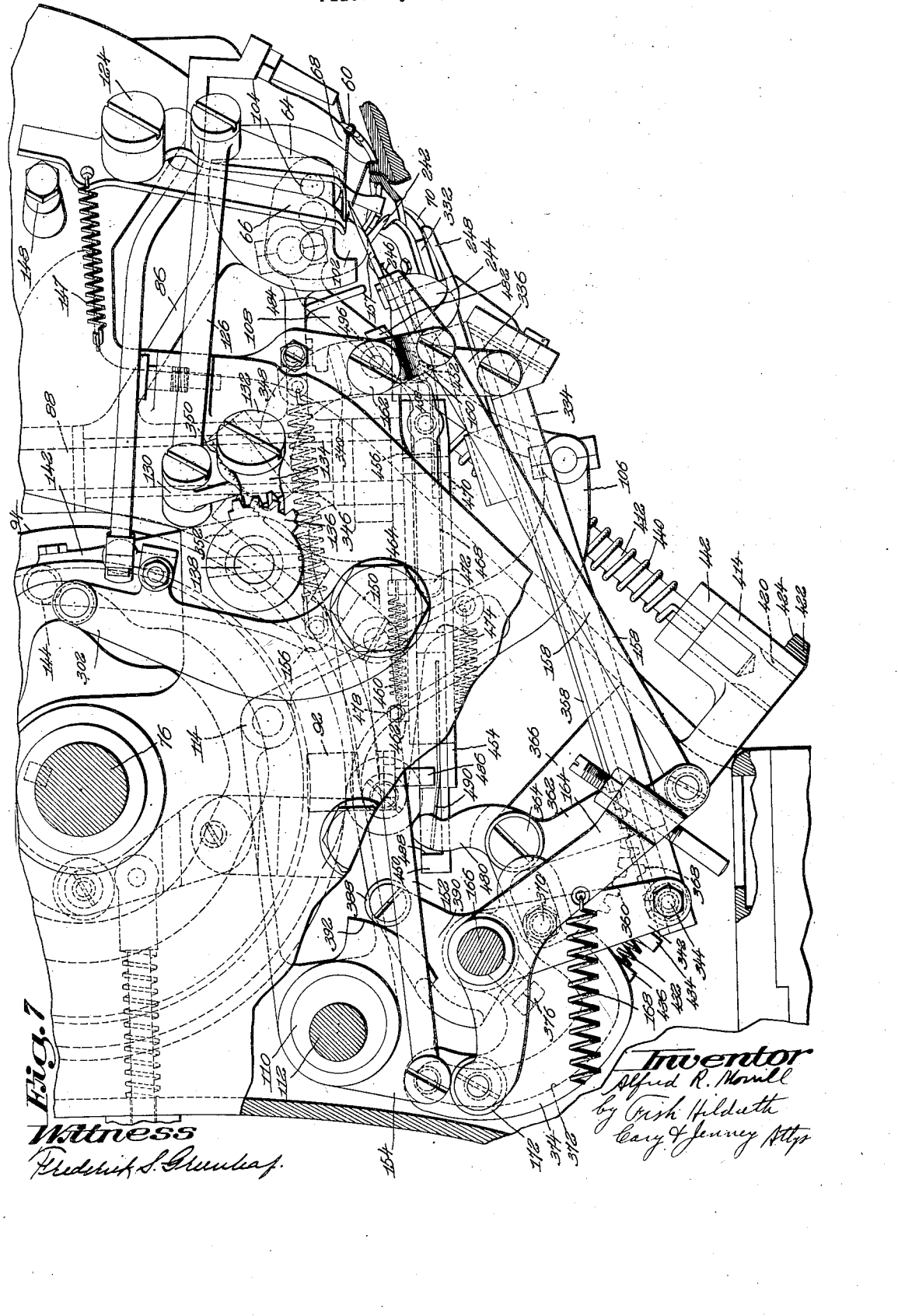

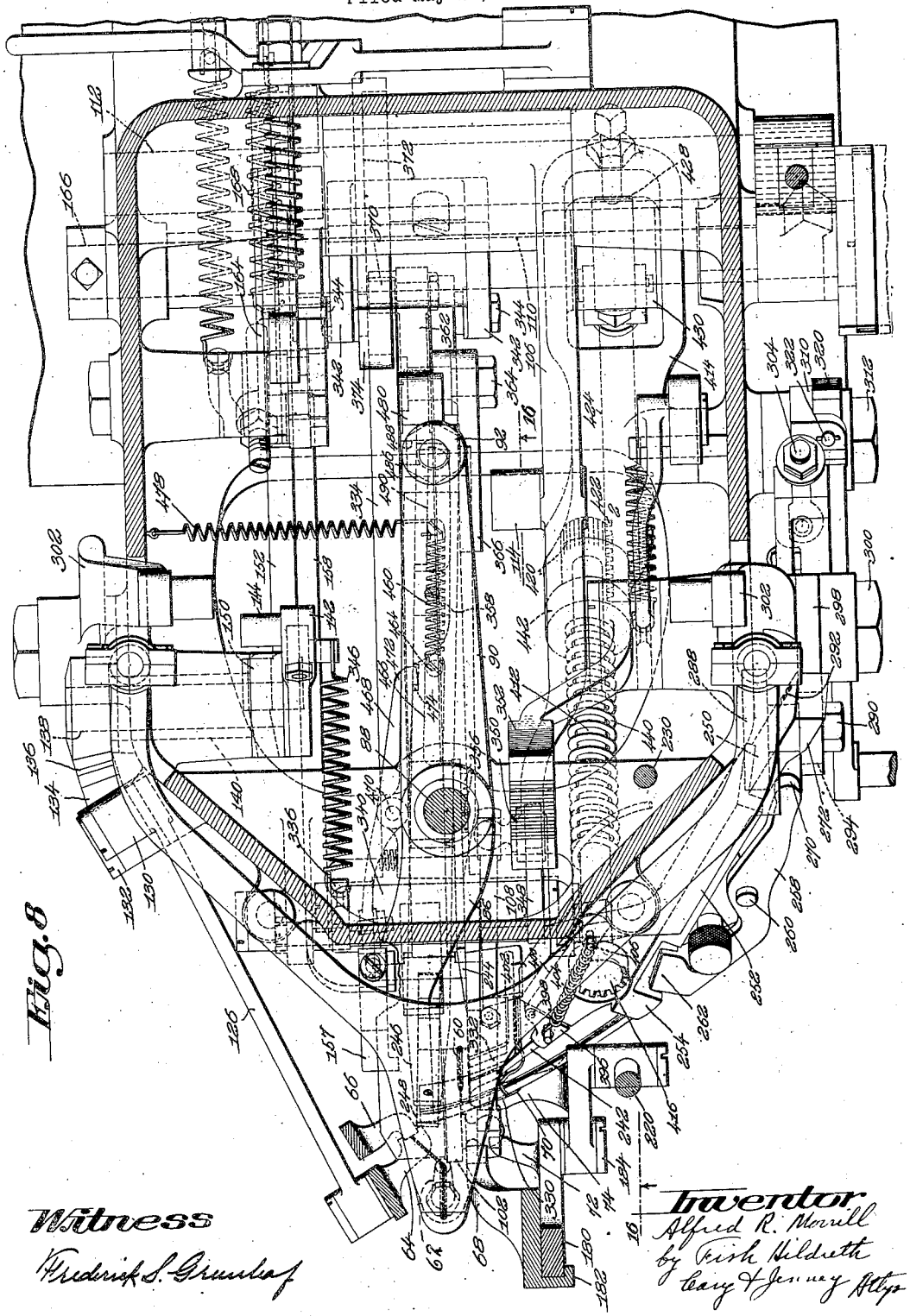

June 13, 1939.  A. R. MORRILL  2,162,026
SHOE MACHINE
Filed May 25, 1935  19 Sheets-Sheet 9
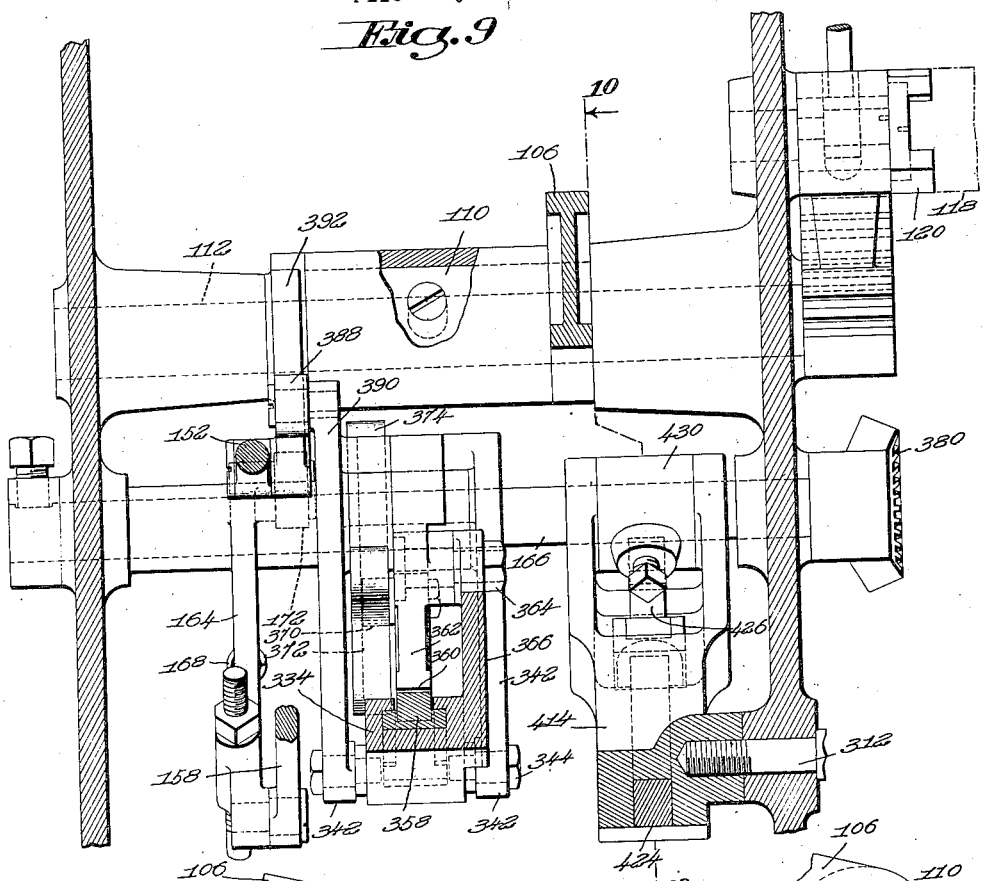
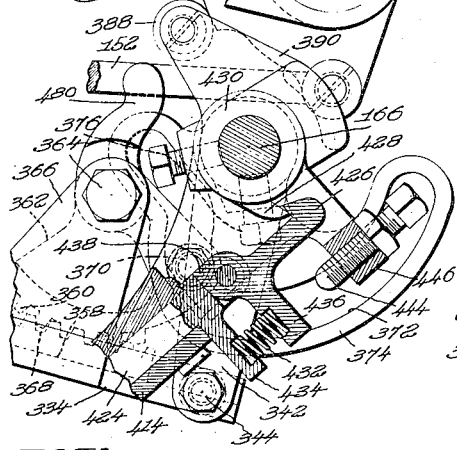
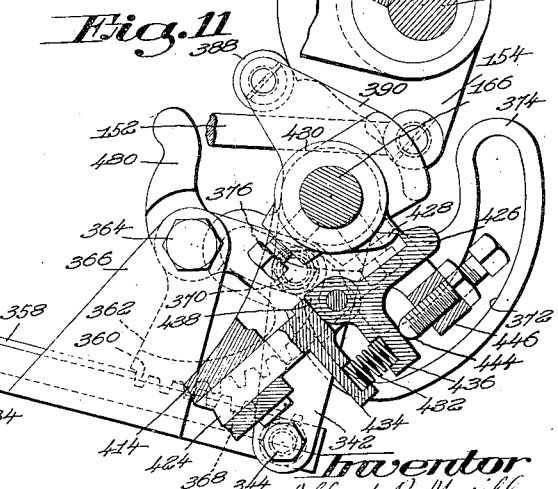

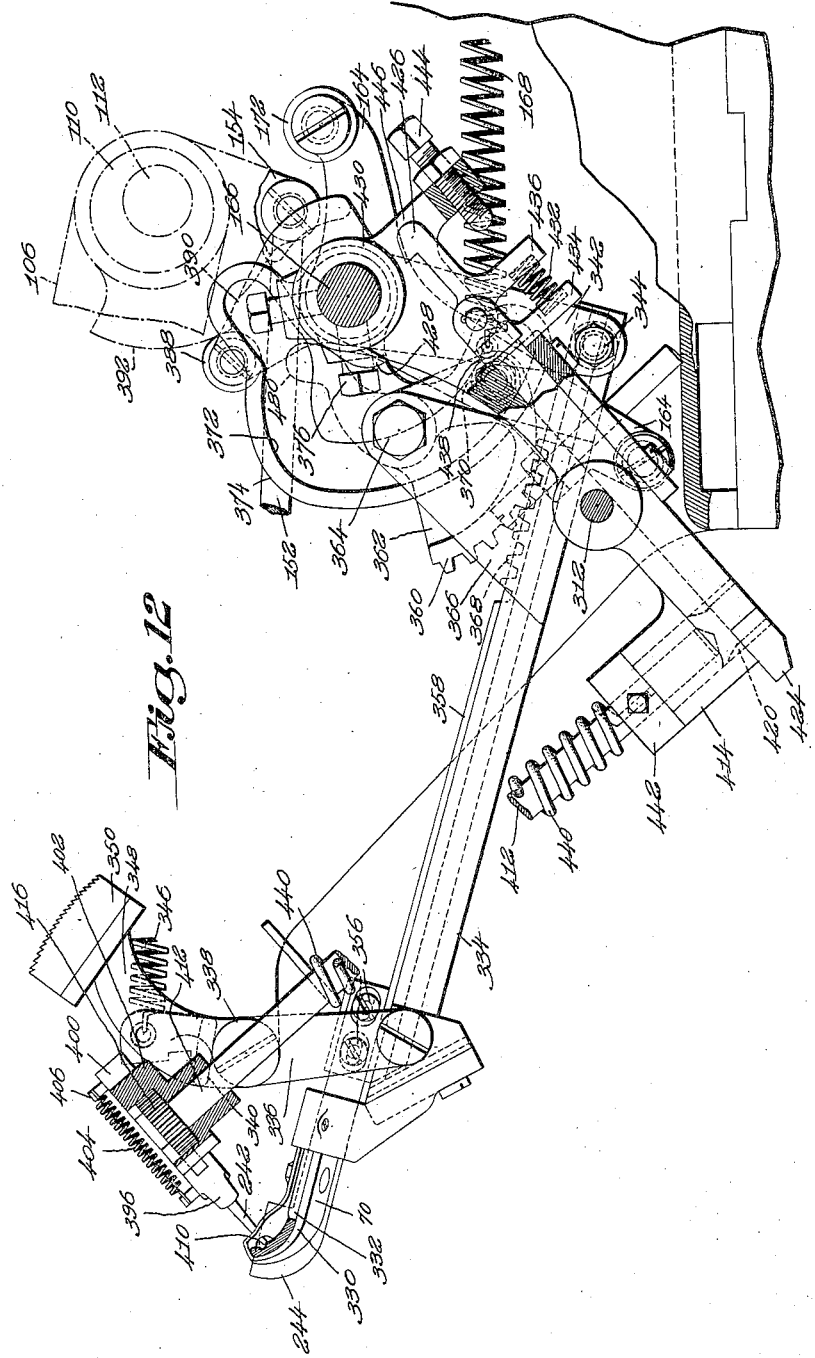

June 13, 1939.  A. R. MORRILL  2,162,026
SHOE MACHINE
Filed May 25, 1935  19 Sheets-Sheet 11
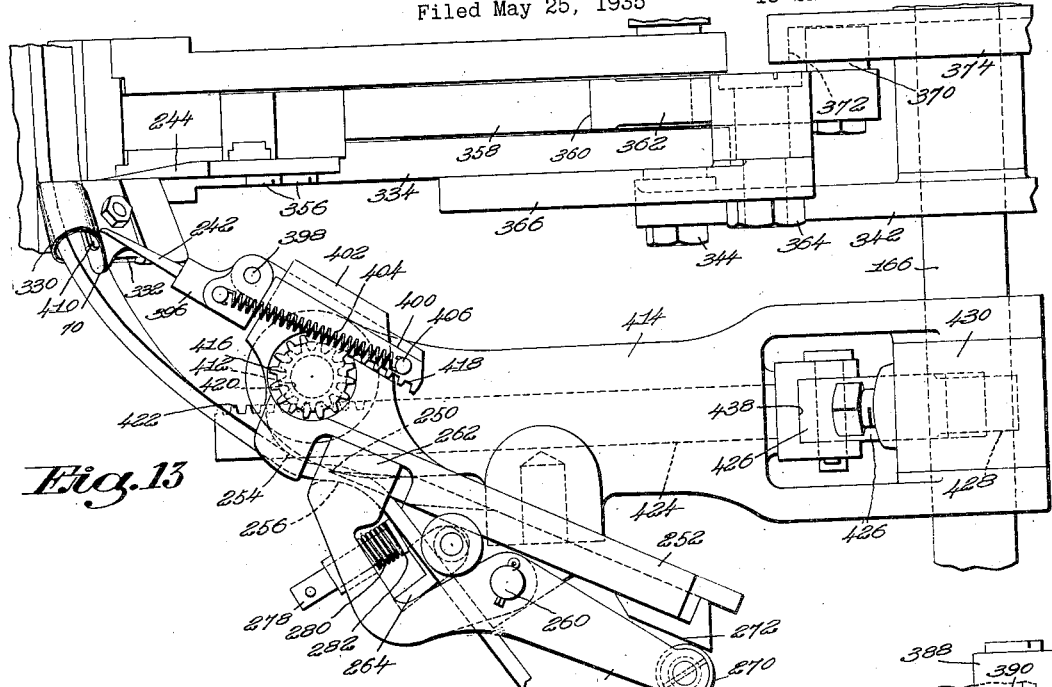
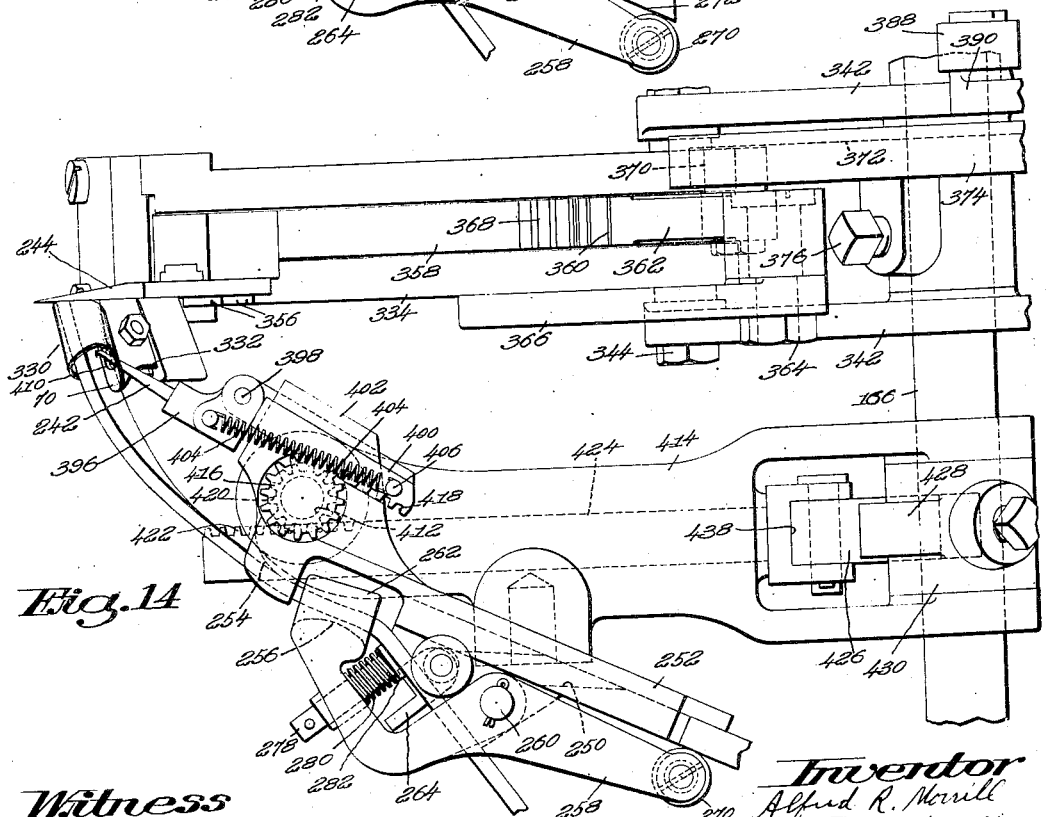

June 13, 1939. A. R. MORRILL 2,162,026
SHOE MACHINE
Filed May 25, 1935 19 Sheets-Sheet 12
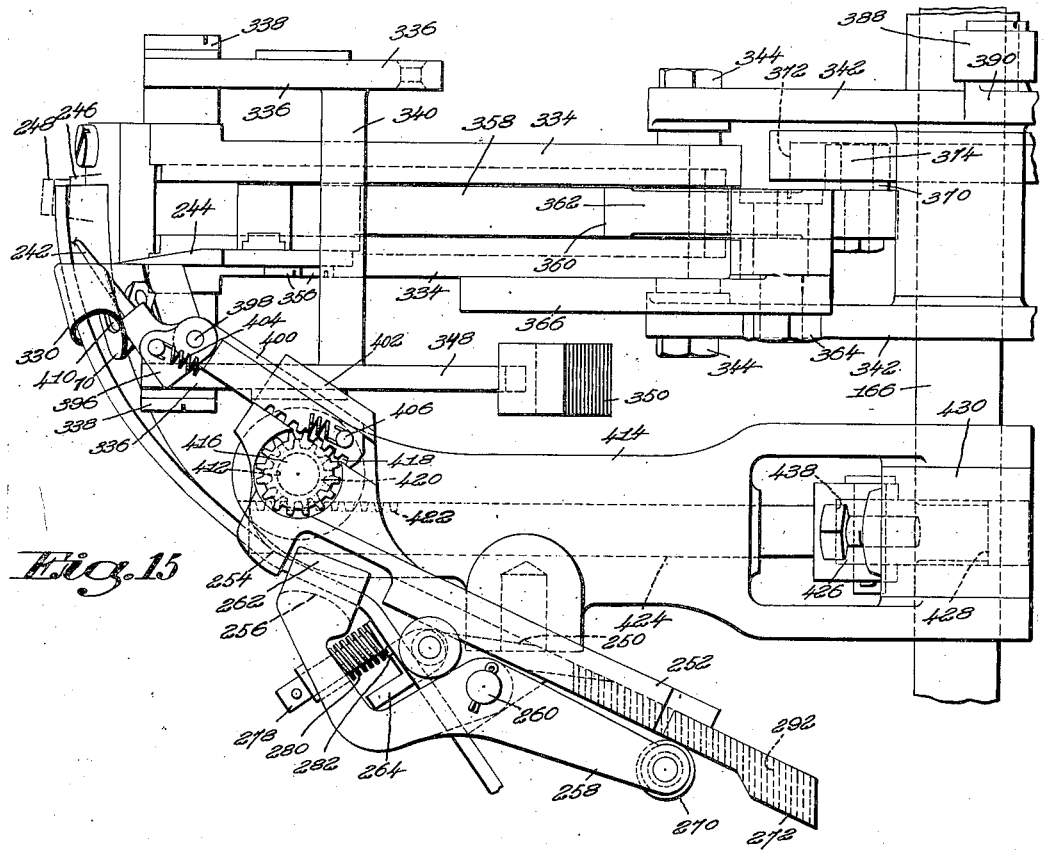

June 13, 1939.  A. R. MORRILL  2,162,026
SHOE MACHINE
Filed May 25, 1935  19 Sheets-Sheet 13
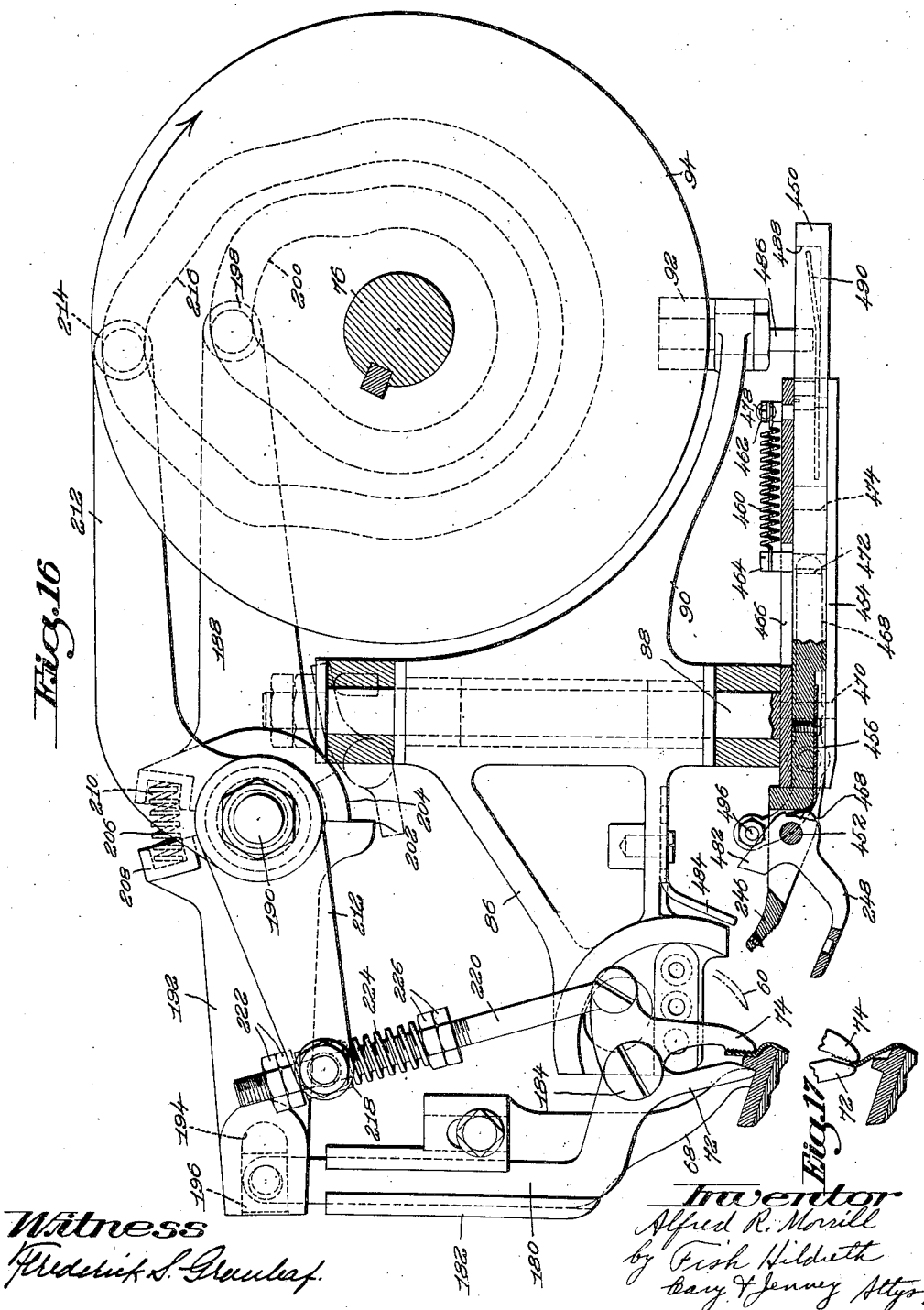

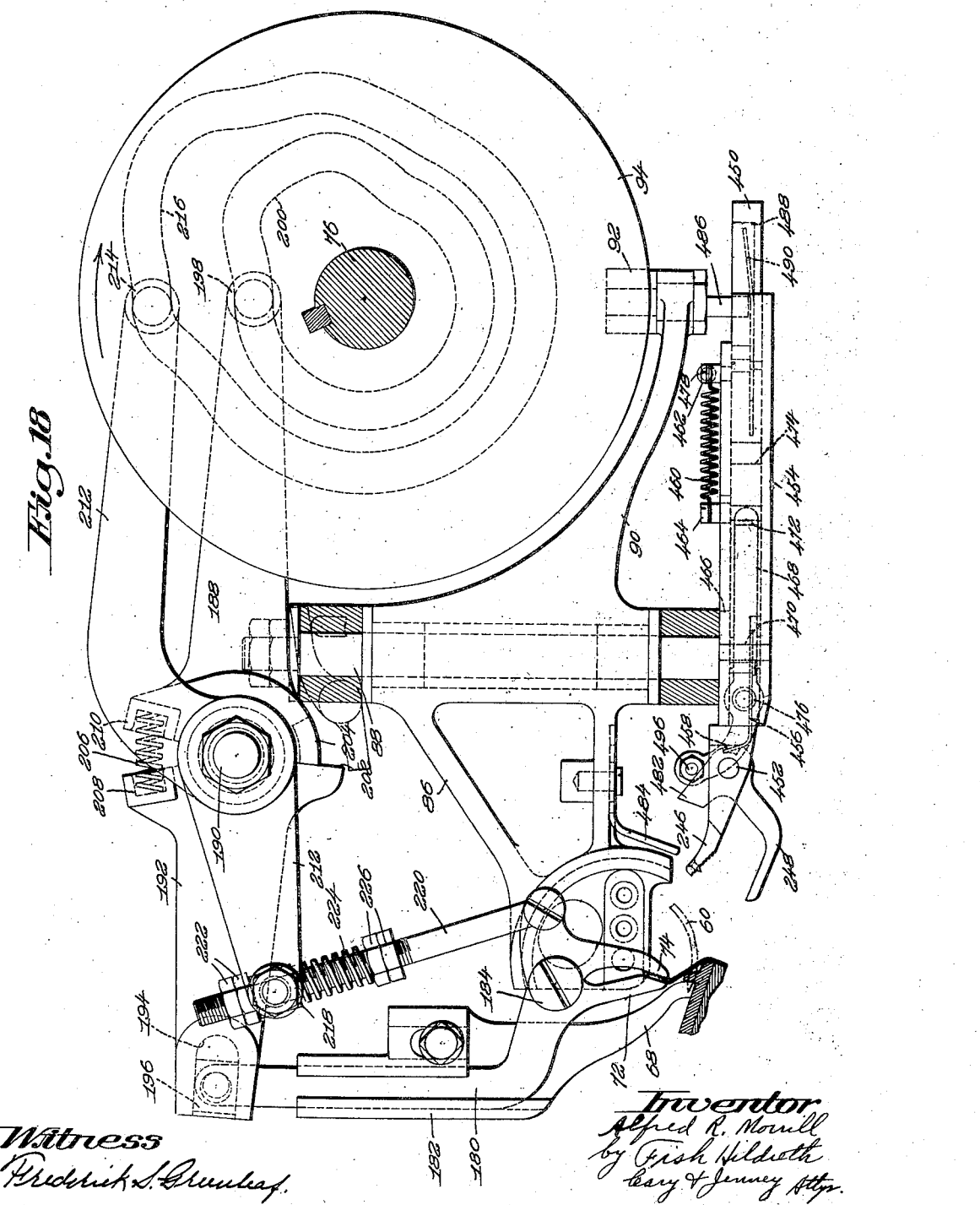

June 13, 1939. A. R. MORRILL 2,162,026
SHOE MACHINE
Filed May 25, 1935 19 Sheets-Sheet 15
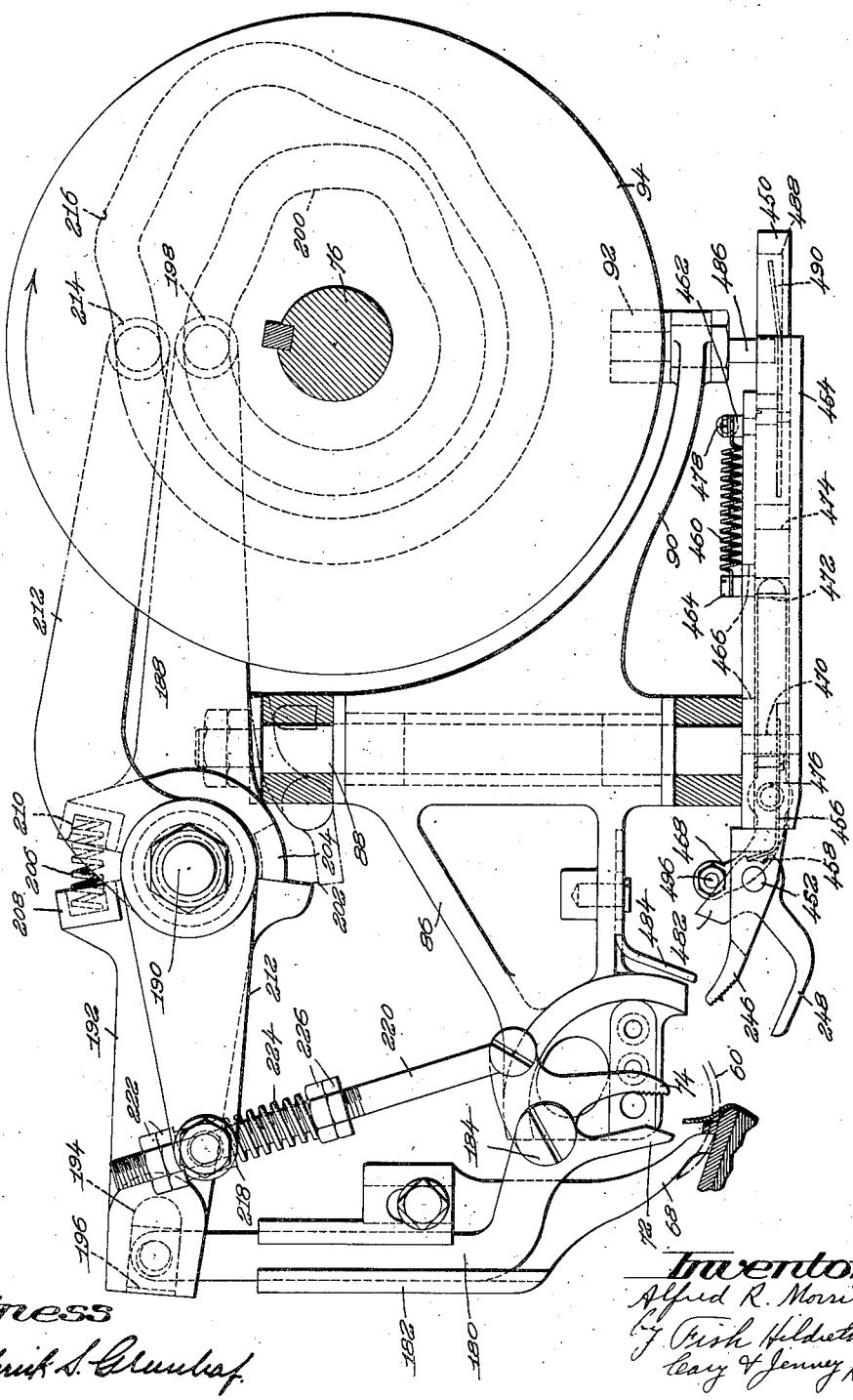

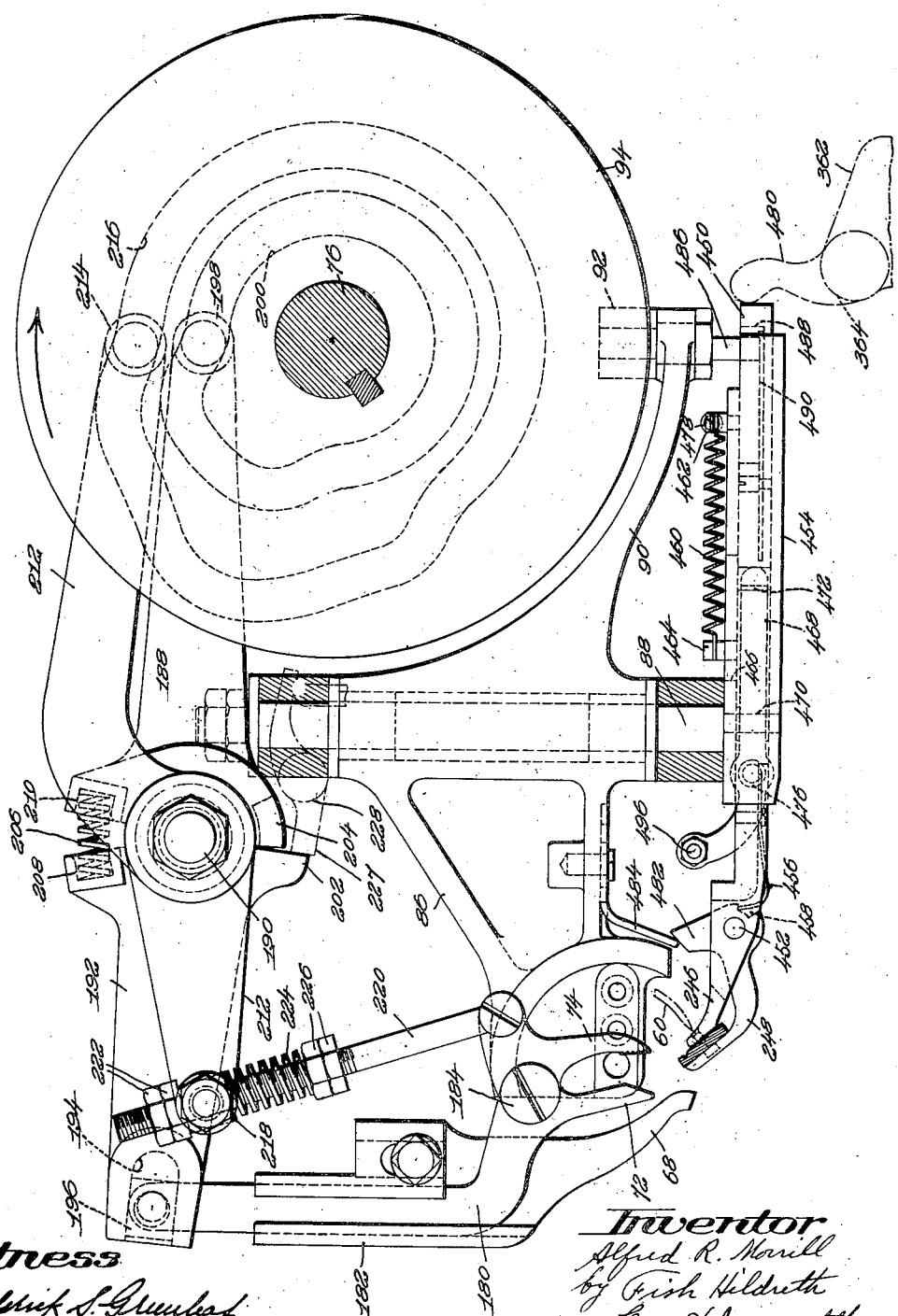

June 13, 1939.  A. R. MORRILL  2,162,026
SHOE MACHINE
Filed May 25, 1935   19 Sheets-Sheet 17
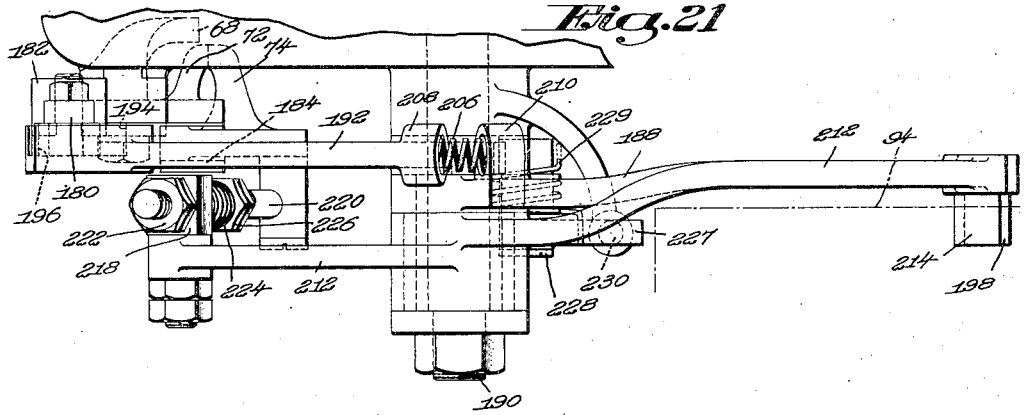
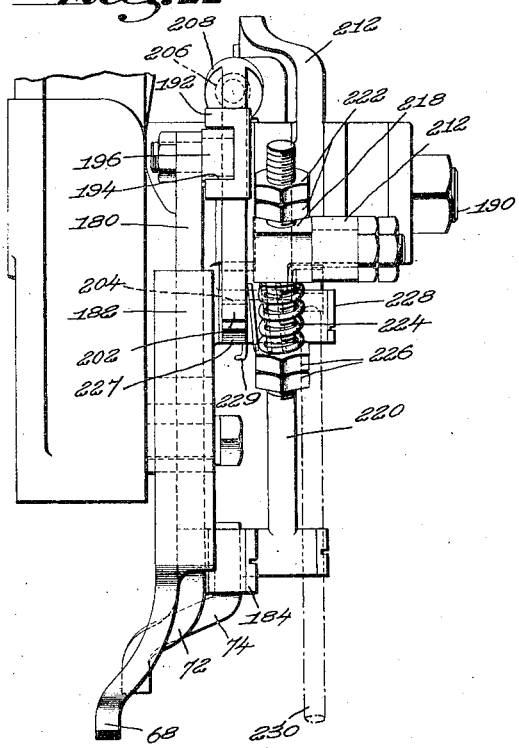
Witness
Frederick L. Grunbach
Inventor
Alfred R. Morrill
by Fish, Hildreth,
Cary & Jenney Attys

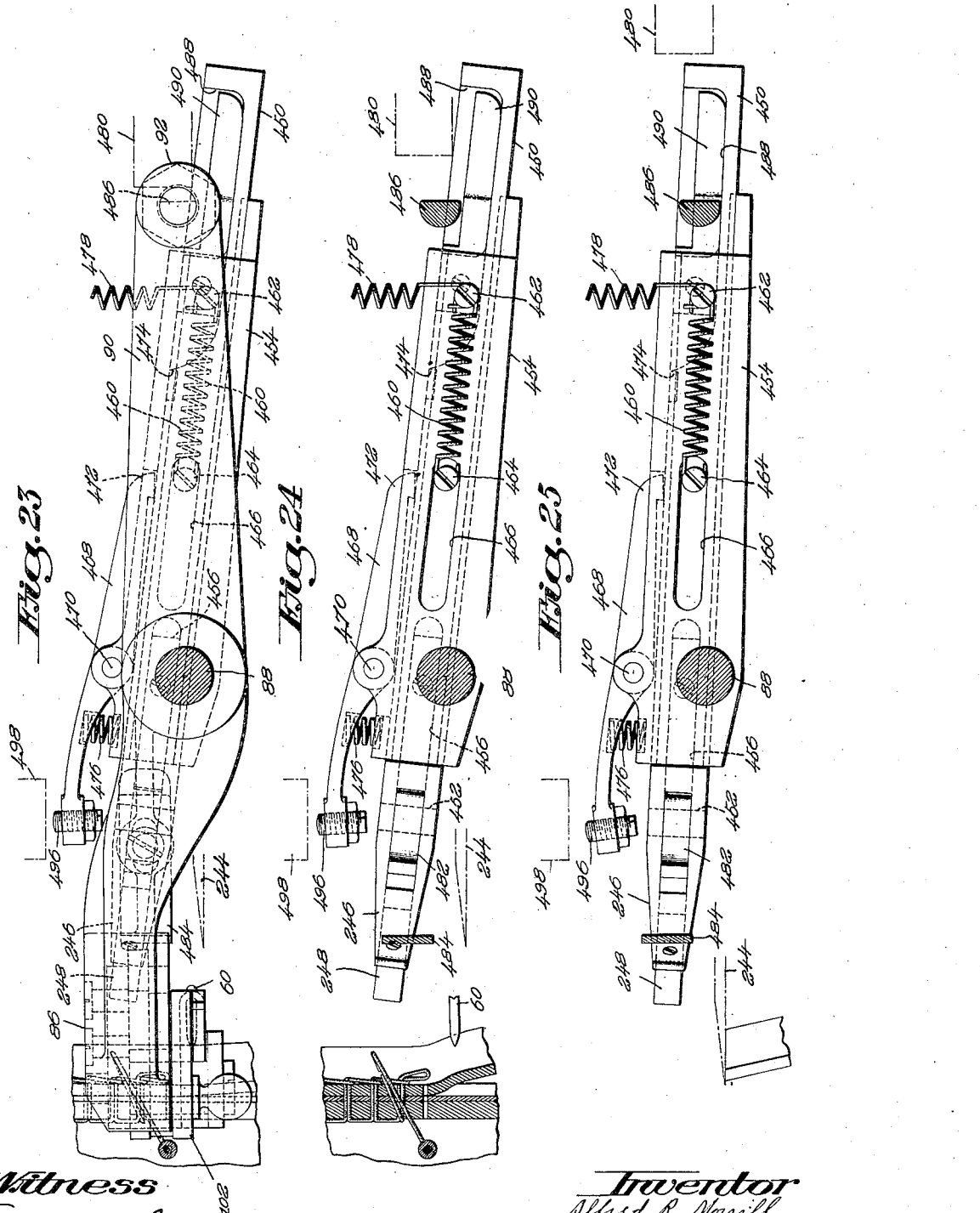

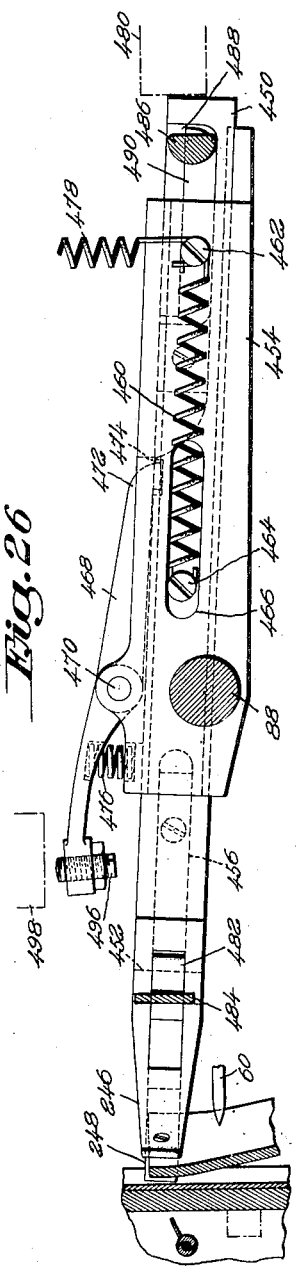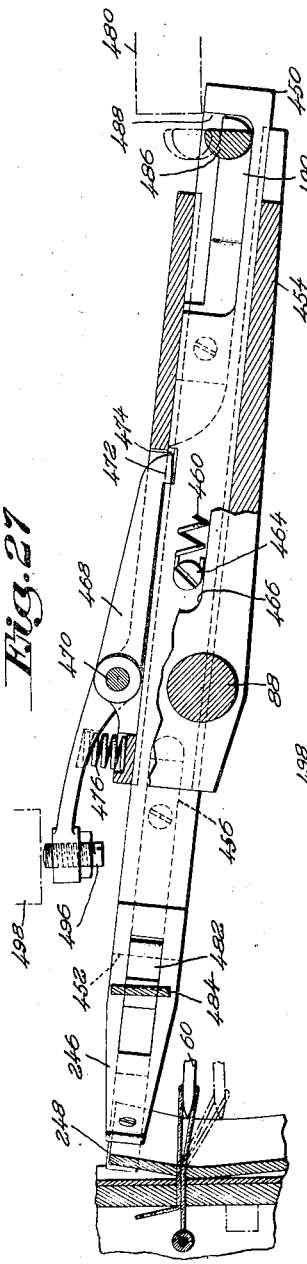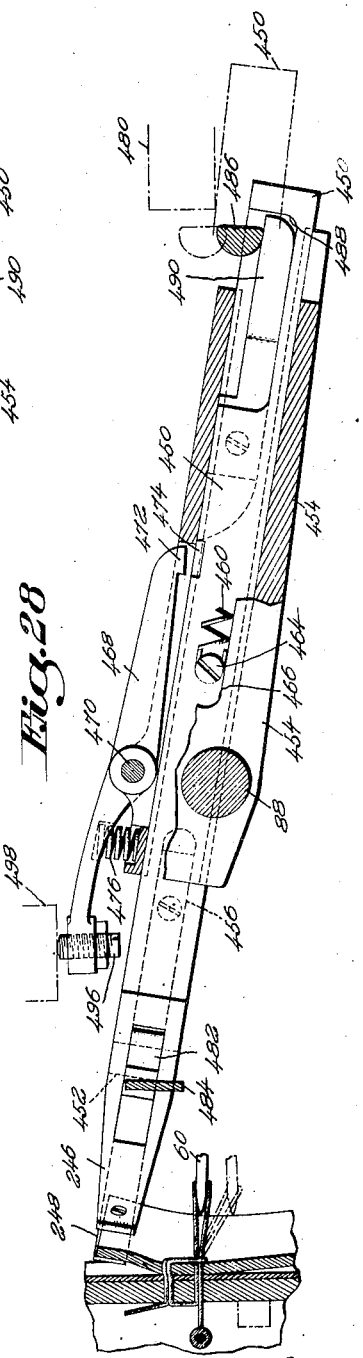

Patented June 13, 1939

2,162,026

UNITED STATES PATENT OFFICE 2,162,026

SHOE MACHINE

Alfred R. Morrill, Beverly, Mass., assignor to United Shoe Machinery Corporation, Paterson, N. J., a corporation of New Jersey Application May 25, 1935, Serial No. 23,462

21 Claims. (Cl. 112—46)

The present invention relates to shoe machines, and is herein shown as embodied in a machine for operating on shoes of the type in which the shoe is supported on a jack and in which the jack and the means for operating on the shoe are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanisms. While the several features of the present invention are particularly applicable to automatic shoe machines of the type above referred to, certain features of the invention are also capable of use in other types of automatic machines, or in machines in which the shoe is held in position by the operator. It is also to be understood that except as defined in the claims, the several features of the invention are not limited to any particular construction or arrangement of parts.

The machine hereinafter specifically described as embodying the several features of the present invention, is an automatic machine for sewing the welt and upper to the insole of a welted shoe, and as to the general construction and mode of operation of its various parts is similar to the automatic welt sewing machine disclosed in the applicant's copending application Serial No. 655,934, filed February 9, 1933, for Shoe machines upon which Patent No. 2,155,438 issued April 25, 1939.

It is an object of the present invention to provide a novel and improved welt feeding device which is rendered operative upon stopping the machine to engage with and drag the severed end of the welt through the welt guide into position for the starting of an operation upon a new shoe.

It is a further object of the present invention to provide a novel and improved mechanism to engage with and positively advance the welt in timed relation to the feeding movements imparted to the shoe during the formation of the initial stitches to insure the correct positioning of the leading end of the welt with relation to the shoe sole and associated upper until the welt is securely fastened in place by the operation of the stitching devices.

Other objects of the invention are to simplify and improve the construction and mode of operation of various parts of welt shoe sewing machines both of the automatic type above referred to, and of the type in which the shoe is presented to the machine while held in the hands of the operator.

Figure 2:
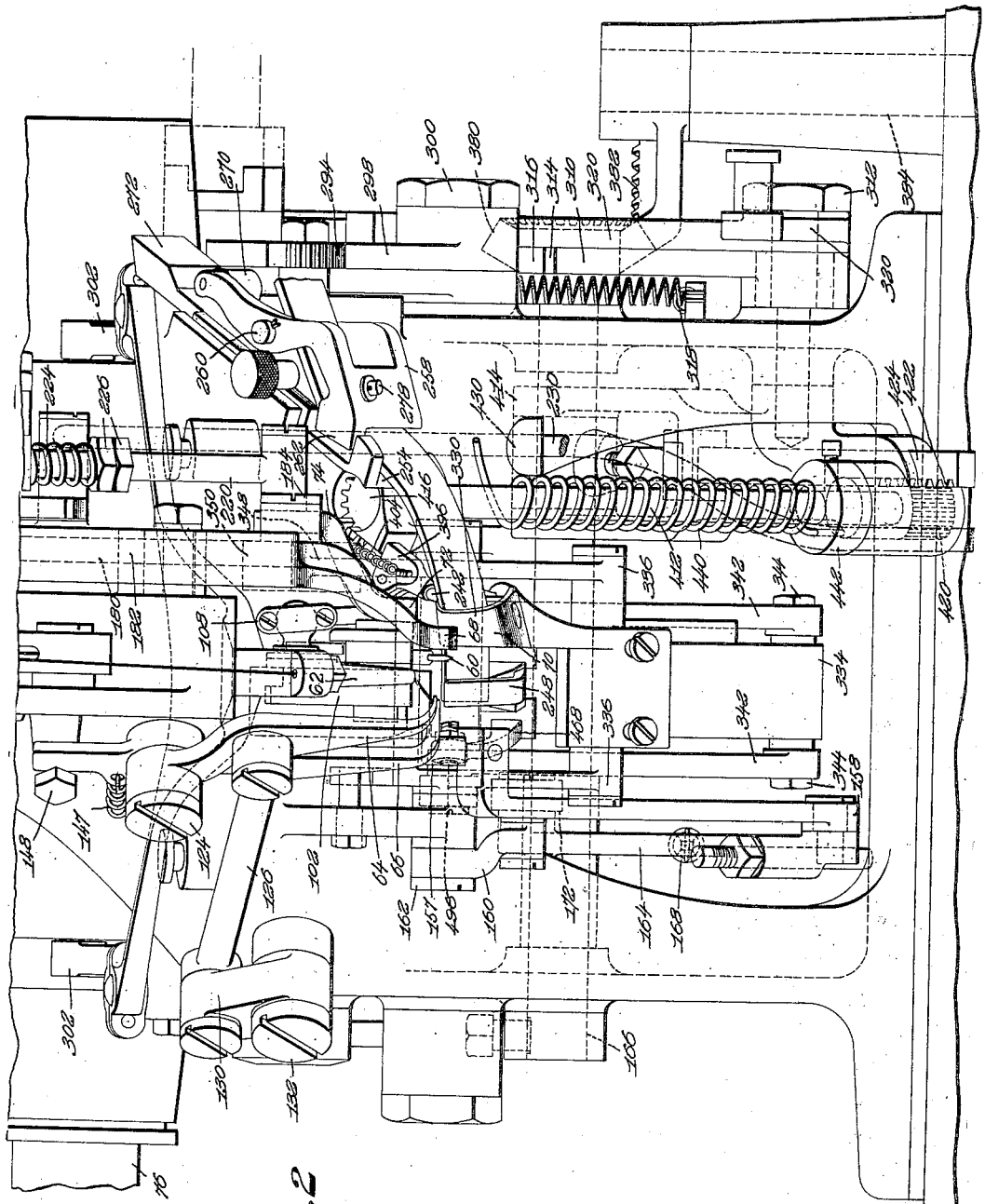

With these objects in view, the several features of the present invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of an automatic welt sewing and lasting machine embodying in a preferred form the several features of the invention; Fig. 2 is an enlarged view in front elevation of a portion of the machine head illustrating particularly the several shoe sewing, guiding and lasting devices of the machine; Fig. 3 is a view in right side elevation of substantially the parts shown in Fig. 2, with the parts shown in stop position; Fig. 4 is a view similar to Fig. 3, with a portion of the machine casing broken away to show underlying parts; Fig. 5 is a view similar to Fig. 4 with the parts shown in a different position taken as the needle is retracted to draw in the first stitch; Fig. 6 is a view of substantially the parts shown in Fig. 2 in left side elevation, with a portion of the machine casing broken away to show underlying parts, and with the machine in stop position; Fig. 7 is a view similar to Fig. 6, with the parts shown in a different position, taken subsequent to the operation of the thread cutter to sever the needle thread in stopping the machine; Fig. 8 is a sectional plan view of the machine head taken substantially on the line 8—8 of Fig. 3; Fig. 9 is a detail sectional view in front elevation taken substantially on the line 9—9 of Fig. 3, to illustrate particularly a portion of the mechanisms for guiding, feeding and cutting the welt; Fig. 10 is a detail sectional view taken on the line 10—10 of Fig. 9, illustrating the parts in the position taken during the operation of feeding the leading end of the severed welt into operating position in stopping the machine; Fig. 11 is a view similar to Fig. 10 taken at the limit of the advancing movement of the welt feeding finger; Fig. 12 is a view similar to Figs. 10 and 11 with added illustration of the welt guide and welt feeding finger, the parts being shown in normal operating position; Figs. 13, 14 and 15 are detail plan views illustrating particularly the welt guide, welt cutter and welt feeding devices, the parts being shown in three successive positions taken during the severing of the welt and the subsequent feeding of the severed end into operating position as the machine is brought to rest; Fig. 16 is an enlarged sectional view taken substantially on the line 16—16 of Fig. 8, illustrating only the lasting gripper mechanism and welt feeding gripper, the parts being shown in position in starting the operation on a new shoe, with the lasting gripper in engagement with the lip of the insole and adjacent portion of the shoe upper; Fig. 17 is a fragmentary detail view illustrating a subsequent position of the lasting gripper with the upper drawn firmly into position; Fig. 18 is a view similar to Fig. 16 just before the lasting gripper 74 opens to release the upper; Fig. 19 is a view similar to Figs. 16 and 18, showing the gripper fully withdrawn and the needle advanced through the work; Fig. 20 is a view similar to Figs. 16, 18 and 19, illustrating the stop position of the parts, with the welt feeding gripper in engagement with the leading end of the welt; Fig. 21 is a detail plan view of the lasting gripper mechanism; Fig. 22 is a detail view in front elevation of substantially the parts shown in Fig. 21; Fig. 23 is a detail plan view of the needle supporting frame and the welt feeding gripper, the parts being shown in the position taken during the sewing of the last stitch; Figs. 24 to 28 inclusive, are views similar to Fig. 23, with the needle supporting frame removed to illustrate particularly the several operating positions taken by the welt feeding gripper in stopping the machine and during the formation of the first two stitches upon a new shoe; Fig. 24 illustrating the position taken by the welt feeding gripper with the welt guide retracted as the needle fails to take the last loop; Fig. 25 illustrating the parts in the position taken after the welt has been cut and with the gripper jaws in position to be advanced; Fig. 26 illustrating the stop position of the parts with the gripper in engagement with the leading end of the welt; Fig. 27 illustrating the position taken by the welt gripper at the completion of the first stitch; Fig. 28 showing the position of the gripper taken during the formation of the second stitch as the gripper is tripped out of operation; and Fig. 29 is a development of the cam for feeding the needle and welt grippers.

The welt shoe sewing machine for sewing the welt to the upper and insole of a shoe while supported on a last herein disclosed as embodying in a preferred form the several features of the present invention, comprises a sewing head generally indicated at 50 within which the sewing and side lasting instrumentalities are housed, a shoe supporting jack comprising a toe support 52 and a heel support 54 pivotally secured thereto, a supporting base 56 within which is housed the supporting and actuating mechanisms for imparting the required feeding, turning and tipping movements to the jack, and a driving and stopping unit for the machine which is housed in a casing 58 on the base adjacent to the sewing head 50.

As has been stated, the general construction and mode of operation of the various parts of the illustrated machine are similar to the corresponding parts of the automatic welt sewing machine disclosed in applicant's patent above referred to. The machine is completely automatic in operation, the shoe being supported on the jack during the sewing operation, and tipping and rotating movements being imparted to the jack in timed relation to the feed of the shoe so as to maintain the shoe at all times in the proper position with relation to the sewing instrumentalities. At the completion of the sewing operation, the driving mechanism for the cam shaft in the head of the machine and for the pattern cam shaft in the base from which the jack is actuated and controlled, is thrown out of operation, and an auxiliary mechanism is thrown into operation which acts to perform certain additional operations including the completion of the rotation of the pattern cam shaft, the depression and outward movement of the jack away from the sewing instrumentalities, and the reverse rotation of the jack to its original position.

As in the machine of the application above referred to, the devices of the present machine for operating upon a shoe comprise a curved hooked needle 60, a looper 62, a thread finger 64, a thread holder or gripper 66, a channel guide 68, and a welt guide 70. In addition to these devices the present machine also is provided with a side lasting gripper comprising jaws indicated respectively at 72 and 74. Cooperating movements are imparted to these devices for operating on the shoe from a sewing cam shaft 76 which is mounted to rotate on a horizontal axis in bearings in the sewing head 50, and is provided at one end with a spiral gear 78 arranged to mesh with a corresponding spiral gear 80 which is formed integrally with a clutch sleeve 82 loosely mounted to turn on a vertical drive shaft 84 on the machine. The shaft 84 is continuously driven through reduction gearing from an electric motor mounted in the upper end of the casing 58.

The control mechanism for imparting positioning and feeding movements to the jack, are arranged to impart a continuous feeding movement to the shoe past the stitch forming devices. To assist in the feeding of the work, the needle is mounted to reciprocate with the work in the line of feed. With the present construction, the needle 60 is mounted on a support or frame 86 which extends rearwardly of the machine, and is sleeved to turn on a vertical pivot shaft 88. A rearwardly extending arm 90 formed on the hub of the support 86, carries a cam roll 92 which is arranged to engage in a peripheral cam groove in the cam disk 94 on the sewing shaft 76, so that a reciprocatory movement is imparted to the support and the needle mounted thereon in the line of feed in timed relation to the sewing cycle.

As clearly shown, for instance, in Fig. 7, the needle 60 is rigidly secured to a needle segment 102 which is loosely sleeved to turn on a stud 104 on the needle support 86, and is reciprocated in timed relation to the other cooperating elements of the machine through connections which include a needle cam lever 106 and a connecting link 108. The cam lever 106 is mounted on an eccentric pivot 110 formed on a rock shaft 112 and carries a cam roll 114 arranged for engagement in a cam groove formed in one face of the cam disk 94 on the sewing cam shaft 76.

The shaft 112 is rocked to vary the needle throw upon stopping the machine through connections comprising a rock shaft 118 (see Figs. 1, 2 and 9) arranged in line with a short shaft 120 mounted in the frame of the sewing mechanism above and slightly in front of the shaft 112. The stop mechanism of the machine illustrated more particularly in Fig. 1 is similar to that disclosed in applicant's patent above referred to, and in the patent to Topham No. 1,791,176, dated February 3, 1931, the shaft 118 being a portion of the lock bolt carrier of the stop mechanism disclosed in said patent. The shaft 118 is connected to the short shaft 120 by inter-engaging slotted blocks, the arrangement being such that the rocking of the shaft 118 during the operation of the stop motion imparts a corresponding rocking movement to the shaft 120. The shaft 120 is provided with a rearwardly and downwardly extending arm having a gear segment meshing with a corresponding segment secured to the outer end of the shaft 112. During the operation of the stop mechanism, the shaft 120 is rocked in a clockwise direction and is then returned partway to its original position. Through the connections above described a rocking movement first in a counterclockwise direction and then a partial return movement in a clockwise direction is imparted to the shaft 112. The eccentric 110 is thus shifted during the last stitch forming cycle to cause the forward movement of the needle to be shortened to such an extent that the thread is not laid in the needle hook during the operation of the looper, and the needle comes to rest out of engagement with the work with no thread in its hook.

The thread finger 64 (see Figs. 2 and 7) comprises a lever arm mounted at its upper end on a pivot stud 124 to swing in a vertical plane, and is connected through a link 126 to the upper end of a lever arm 130 sleeved on a pivot stud 132. Formed on the hub of the lever 130 is a gear tooth segment 134 arranged to mesh with a corresponding gear segment 136 on one end of a rock shaft 138 journalled in a bearing 140 in the machine frame (see Fig. 8), and provided at its other end with an upwardly extending cam lever 142. A cam roll 144 carried on the lever 142 is arranged to engage a cam groove formed in one face of the cam disk 146.

The thread gripper 66 (see Figs. 6 and 7) comprises a lever arm which is pivotally mounted on the stud 124 to swing in a vertical plane, and is forced yieldingly toward the thread finger by means of a spring 147 attached at one end to the gripper lever and at its other end to the machine frame. The movement of the gripper 66 about its pivot is limited by the engagement of the upper end of the lever with a fixed stop 148 on the machine frame.

Mechanism is provided which is arranged upon stopping the machine to impart to the thread finger 64 an abnormal movement to bring the thread finger into engagement with the thread gripper 66 to grip the thread and thereafter through the continued movement of the thread finger to stretch the leg of the bight thus formed extending between the finger and the work into a taut position for subsequent engagement by the thread cutter knife to sever the thread. The thread finger and gripper engaging therewith are then partially retracted to an intermediate stop position with the severed end of the thread still held thereby preparatory to the beginning of a new stitching operation.

In order to impart the required abnormal movements to the thread finger in starting and stopping the machine to grip and position the thread for the cutting operation, and to hold this end during the formation of the first stitch of the new operation, two separate cam grooves and a switch cam are provided for the actuation of the thread finger cam lever 142. Inasmuch as these parts are substantially the same as those illustrated in the applicant's patent above referred to, and more particularly in the applicant's prior Patent No. 1,952,770, dated March 27, 1934, detailed illustration or description of this mechanism is omitted. Upon stopping the machine, the cam lever 142 is moved positively to the left as illustrated, for instance, in Fig. 3, in timed relation to the rotation of the cam shaft 76, causing the cam roll 144 to move outwardly through the switch cam connections from the inner to the outer groove, thus imparting to the thread finger the abnormal movements above described. The mechanism through which this operation is carried out comprises a lever arm 150 loosely hung on the rock shaft 138 and connected through a link 152 with an arm 154 on the rock shaft 112, so that the lever arm 150 is actuated by the operation of the lock bolt carrier as above described to engage with an abutment 156 on the hub of the cam lever 142 to positively move the cam lever 142 and roll 144 outwardly into the outer groove.

There is also provided with the present construction, a novel and improved thread cutter mechanism which is arranged to cooperate with the thread finger and gripper above described upon stopping the machine to sever the thread while held in a taut position between the gripper and the work. In accordance with the present invention a thread cutting knife 157 is provided which is supported on a cutter bar 158 for a thrust movement of the knife forwardly and upwardly so that the knife is caused to cut the taut leg of the bight held by the thread finger and gripper without contact with or interference with other parts of the machine, and also in such a position that there can be no possibility of injury to the shoe through the action of the cutter knife. With the arrangement herein disclosed, a powerful cutter action is insured which enables the knife to be driven through any surplus stock or fringe of leather which may have been left on the shoe sole in the path of the knife. Furthermore, due to the freedom from engagement with other metal parts of the machine, there is comparatively little wear which would tend to dull the tool and cut down the efficiency of the machine. The cutter bar 158 is supported at its forward end on a downwardly extending supporting link 160 pivoted on a stud 162 on the machine frame, and at its rear end is supported on a downwardly extending arm of a cam lever 164 loosely mounted to turn on a rock shaft 166. A tension spring 168 secured at one end to the cam lever 164 and at its other end to the machine frame tends normally to maintain the cutter 157 and bar 158 in a retracted inoperative position.

The cutter knife 157 is advanced in timed relation to the abnormal movements imparted to the thread finger 64 to cut the thread by means of the arm 154 which is secured to the rock shaft 112 and acts as the shaft is rocked to its extreme position by the operation of the lock bolt carrier to engage with a roll 172 formed on the upwardly extending arm of the cam lever 164 to positively advance the knife.

The machine herein disclosed is also provided with a novel and improved side lasting gripper which acts along the sides of the shoe as in the applicant's pending application above referred to, to pull in and position the side portions of the upper with relation to the welt and insole in advance of the sewing operation. The operation of the gripper is automatically controlled as the sewing operation progresses around the shoe to cause the gripper to operate intermittently and progressively along the side of the shoe in time with the stitch forming devices, to cease operating as the sewing proceeds about the toe which has preferably been previously molded, and finally to resume operation again as the sewing is continued along the other side of the shoe. In accordance with certain features of the present invention, a novel and improved lasting gripper is employed which is constructed and arranged to insure the engagement of the gripper with a comparatively short or closely trimmed upper, and has a novel and improved operation with relation to the sewing and feeding devices of the machine to permit a more compact and efficient arrangement of the several cooperating mechanisms for lasting the upper and for stitching the welt to the assembled insole and upper of the shoe.

As best shown in Figs. 2, and 16 to 20 inclusive, the gripper is located adjacent to and immediately in advance of the needle in the line of feed, being supported against movement in the line of feed upon a stationary support. The jaw 72 comprising one of the cooperating members of the gripper, is rigidly formed on the offset lower end of a slide 180 mounted for vertical movements in a guideway 182 formed on the supporting bracket for the channel guide 68. The cooperating jaw 74 of the gripper is pivotally mounted on a stud 184 on the offset portion of the slide 180 to move vertically with the jaw 72 toward and away from the work as a single unit.

The gripper unit mounted in this manner for movements only in a plane normal to the line of feed has the advantage that it can be located in close proximity to the point of operation of the needle about which the shoe is turned as the stitching operation progresses around the shoe sole without interference with other parts of the machine, and more particularly the welt guide. It has been found that the continued feed of the shoe during the relatively brief updraw movement of the gripper unit to pull in the upper serves to assist in positioning the upper tightly and accurately in position for the subsequent formation of a new stitch without at the same time seriously affecting the fit of the upper over the last.

In order to insure the engagement and drawing-in of a short or closely trimmed upper, a feature of the present invention consists in the provision of a gripper unit of novel and improved construction having a mode of operation which enables the gripper to engage with and exert a drawing-in action on the upper at a point much closer to the shoe sole than has heretofore been considered possible without interference with the associated parts of the shoe and last. To this end the jaw 72 of the gripper is constructed and arranged to move downwardly against the shoe sole inside of the channel lip, and is provided with a smooth gripping surface adapted for gripping engagement against the inside face of the upturned channel lip of the insole at the base thereof. The cooperating jaw 74 is provided with a roughened or corrugated gripping surface which is arranged to be brought into gripping engagement with the outer surface of the upper overlying the edge of the shoe inner sole and channel lip. In the operation of this mechanism, the jaws are moved downwardly in open position, and are then permitted to draw together under the pressure of their spring, so that the inner jaw 72 is yieldingly pressed against the channel lip, and the cooperating corrugated gripping surface of the outer jaw engages firmly against the outer portion of the upper which is supported during the subsequent up-draw movement of the gripper, first against the edge of the inner sole and channel lip, and finally against the smooth surface of the gripper jaw 72 as the jaw 72 rides out of engagement with the channel lip during the continued up-draw movement of the gripper unit.

Vertical movements are imparted to the slide 180 to move the gripper toward and away from the work by means of a cam lever 188 supported on a pivot shaft 190 and a lever arm 192 connected to the cam lever 188 as hereinafter described, which lever arm is provided at its forward end with a transverse slot 194 to receive a pivot block 196 on the upper end of the slide 180. The cam lever 188 carries a cam roll 198 which engages in a groove 200 formed in one face of the cam disk 94 to impart a single reciprocatory movement to the cam lever for each revolution of the cam shaft 76. A broken connection is provided between the cam lever 188 and actuating lever 192, so that a yielding downward movement and a positive updraw is imparted to the gripper during each cycle of operations of the machine. The upward movement of the actuating lever 192 is caused by the engagement of an abutment 202 on the sleeve hub of the lever 192 with a corresponding abutment 204 on the sleeve hub of the cam lever 188. The actuating lever 192 is moved downwardly as the roll 198 rides onto the high portion of its cam groove 200 under the influence of a compression spring 206 seated in recesses 208 and 210 in the sleeve hubs of the actuating lever 192 and cam lever 188 respectively.

The jaw 74 is moved positively into open position or yieldingly into closed or gripping relationship to the jaw 72 through connections which include a cam lever 212 loosely mounted to turn on the shaft 190, and provided at its rear end with a roll 214 arranged to engage in a cam groove 216 in one face of the cam disk 94. At its forward end the cam lever 212 is provided with a pivot block 218 journalled to receive the upper end of a link 220 which is pivotally connected at its lower end to a laterally extending portion of the gripper jaw 74. Locking nuts 222, screw-threaded to the link 220, are arranged to engage with the upper side of the pivot block 218, so that a positive upward movement is imparted to the link 220 by the operation of the cam lever 212 to spread or open the jaws of the gripper. A compression spring 224 surrounding the link 220 between the under side of the pivot block 218 and locking nuts 226 on the link 220, acts to impart a yielding downward movement to the link 220 and the cam lever 212, so that a yielding gripping action of the jaws of the gripper is obtained.

To enable the gripper to be thrown out of action, a detent lever 227 is provided pivoted at 228 on the machine frame, and normally held by a spring 229 in engagement with the abutment 202 on the sleeve hub of the lever 192 to maintain the gripper in raised inoperative position against the pressure of the spring 206. During the operation of the lasting gripper the detent lever 227 is held out of engagement with the abutment 202 by the engagement of a vertically movable control rod 230 with the tail of the detent lever 227.

The present machine is provided with means for feeding and conditioning a welt for the welt sewing operation comprising a welt guide 70 through which the welt is fed to the stitch forming devices, a feed finger 242 arranged to advance the leading end of the welt into position for the beginning of a new sewing operation, a welt cutting knife 244 to sever the welt at the end of the operation on a shoe, and a welt gripper having two jaws 246 and 248 to engage with and positively advance the welt during the formation of the first stitch. There is also provided with the present construction, an automatically controlled welt slashing device which is identical with that described and illustrated in the applicant's copending application Serial No. 655,934, above referred to.

The welt slashing device is shown in Figs. 2 to 4 inclusive, and 13 to 15 inclusive, and comprises briefly a welt slashing knife 250 which is arranged to slide in a guideway formed in a bracket 252 on the machine frame. In order to position the welt with relation to the welt slashing knife, the welt is arranged to pass over a guide surface 254 formed in the bracket 252, and is also supported on a curved guiding surface 256 formed on a guiding member 258 which is pivotally secured at 260 to the bracket 252. The welt is positioned laterally in the guiding member 258 between a side plate 262 forming a part of the member 258 and an adjustable block 264. The guiding member 258 is provided at its rear end with a cam roll 270 which is arranged to engage with a cam surface 272 on the under side of the knife, so that on each forward reciprocation of the knife, the cam roll 270 riding on the surface 272 causes the guiding member 258 to be rotated about its pivot 260 to bring the welt into the path of the knife. For tensioning the welt and to maintain it accurately in position on the guiding surface above described during the operation of the knife, a frictional braking surface is provided comprising a pin plunger 278 journalled in the guiding member 258 and a compression spring 280 coiled about the plunger between the guiding member 258 and a frictional disk 282 formed on the inner end of the plunger. With this arrangement of the parts, the advancing movement of the knife causes the guiding member 258 to be rocked so that the flesh side of the welt is positioned substantially parallel to and in the path of the knife to cause a flat shearing cut to be made in the flesh side of the welt.

The connections through which reciprocating movements are imparted to the knife for slashing the welt, comprise a pinion 288 (see Figs. 3 and 4) secured to a rock shaft 290 and arranged to engage with a rack 292 formed on one edge of the shank of the sliding knife 250. A second pinion 294 on the shaft 290 engages a gear segment 296 formed on a horizontally extending arm of a bell-crank 298 loosely sleeved to turn on a pivot shaft 300 which also provides a support for the looper actuating levers 302 as in the application above referred to. The bell-crank 298 is connected to move with a continuously oscillating looper lever 302 to slash the toe portion of the welt by means of a spring-pressed latch 304 which is pivoted on a laterally extending arm of the bell-crank 298 to engage with a lateral extension of the looper lever 302. The latch 304 is moved into and out of locking position to control the operation of the welt slashing knife by means of mechanism which is controlled from the pattern cam shaft of the machine and comprises a latch release lever arm 310 which is loosely mounted to turn on a pivot shaft 312, and is provided with an abutment 314 arranged to engage with a nib 316 on the lower end of the latch 304. A tension spring 318 connected at one end to the lever arm 310, tends to maintain the abutment 314 in engagement with the nib 316 on the latch 304 to hold the latch in its inoperative position. The position of the latch release lever arm 310 is in turn controlled by means of a bell-crank lever 320 which is pivotally mounted to turn on the pivot shaft 312, and has an upwardly extending arm provided with a V-shaped cam surface which is arranged to engage with a corresponding spring-pressed detent pin 322 mounted in the upper end of the latch release lever 310.

In the performance of the sewing and side lasting operations around the shoe sole, the side lasting grippers commence operating when the machine is thrown into operation from the starting position at the shank, are thrown out during the sewing operation around the toe, and are again rendered operative as the stitching operation returns along the other side of the shoe to the shank. The slashing devices, on the other hand, are inoperative at the beginning of the sewing operation, and up to a point somewhat in advance of the time when the point of operations reaches the toe, and are then thrown into operation only to slash that portion of the welt which is to be laid about the toe, being then again disconnected. The operation of the control rod 230 to move the gripper into and out of operation, and of the bell-crank 320 to move the welt slashing devices into and out of operation, are controlled automatically through a single set of operating connections and a cam on the pattern cam shaft of the machine not here illustrated, inasmuch as these parts are identical with those fully described and illustrated in the applicant's Patent No. 2,155,438, above referred to.

The welt guide of the present machine (see Figs. 12 to 15 inclusive) comprises a sheet metal loop 330 and an edge gauge 332 corresponding to the edge gauge of the welt guide commonly used in sewing machines. The loop 330 and edge gauge 332 are rigidly secured to the forward end of the welt guide support or bar 334 supported at its forward end on two parallel links 336 which are mounted to turn on pins 338 and are connected to form a single yoke by a cross piece 340, as shown in dotted lines in Figs. 4 and 5. At its rear end the bar 334 is supported by means of a frame 342 pivotally supported on a rock shaft 166 and having formed thereon two downwardly extending arms with trunnions 344 which engage in corresponding sockets formed in the bar 334. A tension spring 346 secured at one end to an upwardly extending arm formed on one of the links 336, tends to maintain the welt guide in engagement at all times during the operation on a shoe. During part of each cycle the welt guide is rigidly locked in position by means of mechanism which comprises an arm 348 on one of the links 336, as shown in dotted lines in Fig. 6, having at its upper end a rack tooth segment 350 which is arranged for engagement with a corresponding rack formed on one arm of a cam actuated locking lever 352.

With the present construction, a novel and improved mechanism is employed for severing the welt and for positioning and feeding the severed end during the formation of the initial stitches of the next succeeding operation on a shoe. This mechanism comprises the welt severing knife 244, the feed finger 242, and the welt gripper above mentioned, together with the operating connections hereinafter set forth. The welt cutting knife 244 is mounted to slide on the welt guide support 334, so that these parts are combined into a single compact unit arranged to permit the welt to be severed at the end of the operation close to the last stitch. The knife 244, as best shown in Figs. 12 to 15 inclusive, is secured by two set screws 356 to the forward end of a slide 358 which is mounted in a T-shaped guideway formed in the bar 334. The knife 244 is arranged to slide across the edge of the welt guide 330 adjacent the needle to sever the welt close to the sewing point.

The welt cutting knife 244 is actuated to sever the welt through connections which are operated from the auxiliary mechanism for completing the revolution of the pattern cam shaft and for returning the jack to rest position, and act to advance the knife after the formation of the last stitch, and after the depression of the jack, but prior to the movement of the jack forwardly out of operating position. With the present construction, both the forward and return movements of the knife are positively controlled to prevent possible interference with the subsequent feeding movement of the finger 242 for advancing the leading end of the severed welt. The operating connections for the knife comprise a gear segment 360 formed on an arm 362 which is hung on a supporting pivot 364 on a plate 366 formed on the bar 334, and is arranged to mesh with a rack 368 on the slide 358. There is also supported on the lever arm 362, a cam roll 370 which engages in a closed cam groove 372 formed in a lever 374 which is rigidly secured by means of a set screw 376 to the rock shaft 166. The movement of the rock shaft 166 is controlled from the auxiliary mechanism above referred to, through connections which comprise a gear segment 380 as best shown in Figs. 2 and 9, formed on one end of the rock shaft 166, and arranged to mesh with a corresponding gear segment 382 formed on the upper end of the vertical shaft 384. This shaft 384 is rocked by the eccentric of the auxiliary mechanism (not shown, since this mechanism and the mode of operation thereof is old in the art) when the machine is stopped, and forms a part of the connections for disengaging the jack from the sewing devices, and for completing the rotation of the cam shaft of the machine to cause the jack to be rotated in a reverse direction to its starting position. The rocking of the shaft 384 in one direction during the stopping of the machine, causes the cam lever 374 on the horizontal rock shaft 166 to be moved from the raised position illustrated in Fig. 11, to the position shown in Fig. 12, to cause the advance of the knife to sever the welt. As the shaft 384 is again returned to its initial position, the cam lever 374 is returned again to its raised position shown in Fig. 11, to positively retract the knife.

Prior to the rotational movement of the shaft 384 above described, to advance the knife 244 to sever the welt, the bar 334 and welt guide 330 are retracted from the work in timed relation to the rotation of the sewing cam shaft 76, and are rigidly held in a predetermined position to insure constant operating conditions for the welt cutting mechanism, and to prevent possible interference of the knife with the shoe. For this purpose a cam roll 388 is mounted on an arm 390 forming an integral part of the frame 342, and is arranged to engage with a cam 392 rigidly secured to the rock shaft 112, which as above described, is controlled by the operation of the lock bolt carrier of the stop mechanism to cause the miss-looping of the needle in the last cycle of operating of the machine. The cam 392 is positioned so that upon the initial movement of the lock bolt carrier, the roll 388 will ride onto the high portion of the cam 392, and be maintained in this position as the lock bolt carrier is returned to its final stop position. When the lock bolt carrier is permitted to return to its operating position upon starting the machine, the shaft 112 and the cam 392 are returned to the position illustrated in Fig. 5, to release the welt guide, and allow it to be returned into yielding engagement with the work under the influence of the spring 346.

The machine herein disclosed is also provided with a welt feeding finger of novel and improved construction having a new mode of operation which is particularly well adapted to advance the severed end of the welt into position for the beginning of a new operation upon a shoe. Considerable difficulty has been experienced in the use of welt feeding devices previously developed, to force the soft and spongy end of the tempered welt through the welt guide into operating position. There is a tendency for the leading end of the welt when pushed through the welt guide, to be compressed and to thicken up so that the welt either becomes jammed in the welt guide or is not accurately positioned for the beginning of a new sewing operation. One feature of the present invention, therefore, consists in the provision of a welt feeding finger which is arranged to engage with the welt at a point closely adjacent the severed end thereof, to exert a drawing or pulling rather than pushing action on the welt to accurately position the leading end thereof for the beginning of a new operation on a shoe.

As best shown in Figs. 12 to 15 inclusive, of the drawings, the welt feeding finger 242 is mounted in a bracket 396 which is pivotally secured at 398 to a sliding member 400 mounted in a guideway formed in a fixed bracket 402. A tension spring 404 connected at one end to the bracket 396 and at its other end to a pin 406 on the rear end of the slide 400, tends normally to maintain the finger in a straightened position, in which the bracket 396 is engaged with an abutment on the slide 400. The welt feeding finger 242 is arranged, upon an advancing movement of the slide 400, to pass through a slot 410 in the welt guide 330 to engage the welt at a point closely adjacent the severed end thereof. The continued advancing movement of the slide 400 then causes the welt finger to be projected or thrust through the forward end of the welt guide, carrying with it the leading end of the welt, so that the welt is accurately positioned for the beginning of a new operation. Figs. 13, 14 and 15 illustrate the successive positions taken by the welt finger during the operation of advancing the welt. It will be noted from a consideration of these figures, that the welt finger approaches the welt at a sufficient angle to insure a biting engagement of the finger with the welt, and as the slide is advanced, is permitted to move into a position more closely parallel to the direction of movement of the welt to permit the projection or thrusting of the finger through the closed forward end of the welt guide. During this operation the spring 404 acts to maintain the point at all times in biting engagement with the welt to insure an efficient and accurate performance of the welt feeding operation. As above pointed out, the construction and mode of operation of the welt finger here disclosed is to be distinguished from that of the applicant's Patent No. 2,155,438, in that the action is essentially one of pulling rather than pushing. Also, a great deal less space is required for the locating and operation of the welt guide and welt feeding finger than in constructions previously developed, thus permitting the lasting grippers to be placed nearer the sewing point.

The welt finger 242 and slide 400 of the present construction, are actuated from the vertical rock shaft 384 and eccentric mechanism above referred to, through mechanism which comprises a rotatable shaft 412 supported in bearings formed in the bracket 402 carrying the welt finger slide 400 and in a bracket 414, and provided at its upper end with a pinion 416 arranged to mesh with a rack 418 in the slide 400. At its lower end the shaft 412 is provided with a pinion 420 (see Fig. 2) which is arranged to mesh with a rack 422 formed in a rack bar 424 arranged to slide in the bracket 414. At its upper end the rack bar 424 carries a pivoted latch lever 426 which is arranged for engagement with a corresponding abutment 428 formed on a sleeve member 430 rigidly secured to the rock shaft 166. A compression spring 432 seated in a recess in a laterally extending arm 434 of the rack bar 424 and in a laterally extending arm 436 of the latch lever 426, tends normally to maintain the latch lever in a straightened position determined by the engagement of an abutting surface 438 on the latch lever with the corresponding surface on the rack bar 424 to maintain the latch lever in position in the path of the abutment 428. During the normal operation of the machine, the slide 400 and feed finger 242 are maintained in a retracted position with the rack bar 424 and latch lever 426 in the correspondingly depressed position shown, for instance, in Fig. 5, by means of a torsion spring 440 coiled about the rock shaft 412 and secured at one end to a collar 442 on the shaft, and at its other end to an adjacent portion of the machine frame.

In the operation of the machine, the actuation of the lock bolt carrier to stop the machine as above pointed out, operates to rock the shaft 112, causing the cam roll 388 to ride onto the high portion of the cam 392 to retract the welt guide 330 to a predetermined position as above described. The subsequent rocking of the vertical shaft 384 under the influence of the eccentric following the usual mode of operation of machines of this type as above described, then acts to rotate the shaft 166 in a clockwise direction as shown in Figs. 10, 11 and 12, to cause the welt severing knife to cut off the welt. During the return movement of the rock shaft 166 to its initial position, the abutment 428 is brought into engagement with the latch lever 426 to advance the rack bar 424 and cause the welt finger 242 operating as above described, to advance the severed end of the welt into operating position preparatory for the beginning of a new operation on a shoe. As the shaft 166 and abutment 428 reach the limit of their return movement in a counterclockwise direction, the laterally extending arm 436 of the latch lever 426 is engaged by a stop pin 444 adjustably mounted on a stationary arm 446 on the bracket 414 to trip the latch lever out of engagement with the abutment 428, and permit the return of the welt finger 242 and its actuating mechanism to normal inoperative position under the influence of the spring 440.

It will be noted that the operation of the welt severing knife 244 and the welt feeding finger 242 overlap to permit a relatively slow feeding movement of the welt pusher or feed member 242 to prevent possible injury to the soft and rather flexible tempered welt. The positive return movement imparted to the knife of the present construction, insures the proper timing of the operation of the parts to prevent possible interference, with consequent faulty operation or injury to the machine.

In accordance with one feature of the present invention, a novel and improved welt gripper is provided which is arranged to grip the leading end of the severed welt, and to feed the welt with the shoe and jack during the formation of the first stitch or stitches on the new shoe. With the present construction, the gripper is arranged to grip the leading end of the welt advanced by the feed finger as above described, at the end of the operation on the old shoe. The welt gripper is then advanced in the line of feed during the formation of the initial stitch or stitches on a new shoe. The applicant is aware that welt grippers have been previously developed for feeding the leading end of the welt with the shoe. It has been found, however, in gripping devices of this sort previously developed, that when the gripper is released so that the entire strain of feeding the welt with the shoe is thrown upon the initial stitch or stitches in the work, there is a tendency for these stitches to give slightly and permit the welt to lag, resulting in the displacement of the welt from its proper position on the shoe, and causing a poor start of the welt. With the present construction, this difficulty has been overcome to insure the proper positioning of the welt on the shoe sole, by causing the welt gripper to advance the welt during the first stitching operation in advance of or somewhat beyond the position which it is expected to occupy on the shoe, so that the subsequent drag of the welt against the stitch after the release of the gripper, will serve merely to locate the welt in its proper position on the shoe sole.

As best shown in Figs. 16 to 20, and 23 to 28 inclusive, the welt grippers 246 and 248 are supported on a gripper slide 450, the upper gripper 246 being formed integrally therewith, and the lower gripper 248 being mounted on a pivot 452. The slide is mounted in a support 454 loosely mounted to turn about a vertical pivot formed on the lower end of the pivot shaft 88 of the needle support. A leaf spring 456 secured to the under side of the slide, engages in a slot 458 formed in the hub of the lower gripper arm 248 to maintain the gripper normally in the open position illustrated in Fig. 16. The gripper jaws are closed against the pressure of the spring 456 to grip the welt, as the slide 450 is advanced into operating position, by the engagement of an arm 482 on the gripper jaw 248 with a downwardly extending plate or stop 484 secured to the needle supporting frame 86. The slide 450 is normally maintained in a retracted inoperative position by means of a tension spring 460 which is connected at one end to a pin 462 on the support 454, and at its other end to a pin 464 secured to the slide 450, and extending upwardly through a slot 466 in the support 454. There is also mounted on the side of the support 454, a latch lever 468 arranged to turn on a pivot 470 on the support 454, and provided at its rear end with a lug 472 arranged to engage in a corresponding notch 474 in the side of the slide 450 to maintain the gripper slide and gripper members in an advanced operative position against the pressure of the spring 460. A compression spring 476 seated at one end in the support 454, and at its other end in a forwardly extending arm of the latch lever 468, tends to maintain the lug 472 in engagement with the notch 474. A tension spring 478 secured at one end to the pin 462, tends to swing the support 454 and gripper mounted thereon laterally about the supporting pivot shaft 88 in a counterclockwise direction as illustrated in the plan views Figs. 23 to 28 inclusive, to bring the gripper into position for gripping the leading end of the welt.

The mechanism for advancing the gripper slide 450 and gripper jaws 246 and 248 into position to grip the welt, comprises an upwardly extending arm 480 forming part of the lever 362 for advancing and retracting the welt severing knife. Rotational movements are imparted to the support 454 and gripper slide 450 about the supporting pivot 88 to advance the gripper jaws in the line of feed against the pressure of the spring 478 by means of a pin 486 formed on the under side of the cam actuated needle feeding lever 90, which is arranged to engage with the side of a recess 488 formed in the rear end of the gripper slide 450, and with a leaf spring 490 supported in the recess, as will be described.

The operation of the gripper jaws to engage with and feed the welt during the formation of the first stitch, will be understood from an inspection of Figs. 23 to 28 inclusive, in which Fig. 23 illustrates the normally inoperative position of the gripper assembly in which the gripper slide 450 occupies a fully retracted position under the influence of its spring 460, and in which the support 454 and slide 450 are held out of the path of the continuously oscillating pin 486 on the cam lever 90 by engagement of the arm 480 with one side of the gripper slide. The rocking of the lever 362 which acts, as above described, to advance and thereafter to retract the welt severing knife 244, first causes the arm 480 to be retracted to the position illustrated in dot and dash lines in Fig. 25, so that the support 454 and welt gripper slide 450 are permitted to turn laterally about the pivot 88 under the influence of the spring 478 to bring the rear end of the slide 450 into the path of the arm 480 upon its return forward movement. This rotational positioning movement of the slide 450 and support 454 at the same time causes the pin 486 to ride over the low portion of the leaf spring 490, as the needle actuating lever comes to rest upon the stopping of the machine with the needle at the limit of its retracting movement in the line of feed. The subsequent return movement of the lever arm 362 to retract the welt cutting knife 244 as above described, now causes the lever arm 480 to be advanced to engage with and push the slide 450 to the fully advanced position illustrated in Figs. 20 and 26, to position the upper gripper jaw 246 against the leading end of the welt which has been severed and advanced by the operation of the feed finger 242 into position for the beginning of a new operation on a shoe, and simultaneously through the engagement of the arm 482 with the abutment 484 to swing the lower gripper jaw 248 upwardly into clamping position to securely grip the leading end of the welt. As above pointed out, the advancing movement of the slide 450 causes the latch 472 of the latch lever 468 to be brought into engagement with the recess 474 in the slide to maintain the slide in its advanced position against the pressure of the spring 460. It will also be noted that the advancing movement of the slide 450 has acted to move the raised portion of the spring 490 beneath the pin 486 and cause the pin to be located in the rear end of the recess 488. The operations as thus far described, take place at the end of an operation upon a shoe, so that the welt is securely held in the proper operating position by the gripper devices, and needs no further attention from the operator when a new shoe is placed in the machine.

When a new shoe has been placed in position on the jack, and the machine is again started in accordance with the usual mode of operation of these machines, the needle is moved downwardly through the work, and is then advanced in the line of feed in timed relation to the continuous feed of the shoe by the jack. The movement of the needle feed cam lever 90 to advance the needle in the line of feed, causes the pin 486 engaging in the recess 488 to swing the welt gripper slide 450 and its support 454 about the pivot 88 to carry the grippers and welt held thereby forwardly with the needle and shoe in the line of feed. As the needle support 86 and needle reach the limit of their advancing movement in the line of feed, and the pin 486 reaches its corresponding limiting position shown in full lins in Fig. 27, the rear end of the slide 450 will ride out of alignment with the lever arm 480 which moves forwardly to the dot-and-dash position shown in Fig. 27 to prevent the return of the slide 450 under the pressure of its spring 479 with the return movement of the needle lever 90 and pin 486. This movement of the lever arm 480 is caused by the slight rocking movement of the shaft 112 in a clockwise direction (see Fig. 12) as the locking bolt is withdrawn and the machine clutch moves to operating position which causes the roll 388 to ride off of the high portion of the cam 392, allowing the slide 334 and welt guide 244 to move forwardly into yielding engagement with the shoe. During the return movement of the needle support about its pivot 88 to return the needle to its retracted position in the line of feed, the pin 486 is returned to the dot-and-dash position shown in Fig. 27, riding off of the leaf spring 490 which is permitted to rise into the path of the return movement of the pin 486. As the needle is again advanced in the line of feed, the pin 486 engaging with the side of the spring 490, operates to further rotate the slide 450 and support 454 about the pivot 88, so that an adjustable stop pin 496 on a forwardly extending arm of the latch lever 468 is brought into engagement with a fixed abutment 498 on the machine, causing the latch 472 to be moved out of engagement with the recess 474, to permit the return of the gripper slide rearwardly under the pressure of its spring 460 to its fully retracted inoperative position. The retracting movement of the slide 450 causes the arm 482 of the gripper jaw 248 to be moved away from the abutment 484, so that the gripper jaw 248 is permitted to swing downwardly to its open position illustrated in Fig. 16, to release the welt. The parts will now occupy the normal rest position illustrated in Fig. 23, in which the pin 486 is permitted to ride idly over the base portion of the spring 490 during the repeated reciprocations of the needle feed cam lever 90 withcut causing any further rotational movement of the gripper slide 450 and support 454, which are held laterally in inoperative position against the pressure of the spring 478 by the engagement of the rear end of the slide 450 with the side of the lever 480.

In accordance with the present invention, means are herein provided for securing a feeding movement of the welt gripper in advance of and at a faster rate than the feed of the shoe supported on the jack to position the welt during the formation of the first stitch somewhat in advance of the position in which it is to be finally secured on the shoe. To this end the cam path followed by the roll 92 of the needle cam actuated lever 90 with the present construction, as best shown in Fig. 29, illustrating a developed view of the needle actuating cam 500 and roll 92, is arranged to feed the needle at a rate slightly faster than the rate of feed imparted to the shoe by the jack, so that the welt gripper, which is advanced with the needle cam lever during the first cycle of operation of the machine, has imparted thereto an additional increment of movement in the line of feed in advance of that imparted to the shoe by the feeding movements of the jack which has the effect of placing the welt at the end of the first feeding movement of the needle an appreciable distance in advance of the position in which it is to be finally secured on the shoe. Inasmuch as the needle, following the usual mode of operation of these machines, is in actual contact with the shoe during approximately only one-half of its feeding stroke, the slightly faster rate of movement of the needle during the relatively short time of engagement with the work will not produce a large enough differential to interfere with the normal operation of the machine. The movement of the welt gripper at this faster rate continuing throughout the entire length of the feed stroke of the needle lever 90 corresponding to about 300 degrees of rotation of the main cam shaft, however, does have the effect of moving the welt an appreciable distance in advance of the shoe during the same interval. Then during or just prior to the back feeding of the needle, the slight slipping movement of the welt with relation to the advancing shoe, causes the welt to assume exactly the position desired. At the beginning of the next feeding operation of the needle, as above pointed out, the welt grippers are again advanced slightly and then tripped out of operation.

Certain features of the machine herein disclosed but not claimed relating particularly to the mechanisms for lasting and for lasting and sewing form the subject-matter of a divisional application Serial No. 204,598 filed April 27, 1938.

The invention having been described, what is claimed is:

1. A welt sewing machine having, in combination, feeding and stitch forming devices including a needle for sewing a welt to the shoe, a welt guide having a portion substantially surrounding the welt to engage with and guide the welt adjacent the sewing point, a welt feeding finger arranged to engage the welt within said portion of the welt guide, and means for feeding said finger to engage the welt within said portion of the guide and to advance the finger through and beyond said guide to position the welt for the start of a new operation.

2. A welt sewing machine having, in combination, feeding and stitch forming devices including a needle for sewing a welt to a shoe, a welt guide through which the welt is passed to position the welt adjacent the sewing point, a feed finger having a feeding movement to engage and pass with the leading end of a welt in said guide through and beyond the guide, and means for actuating said finger to position the welt in the path of the needle for the start of an operation on a shoe.

3. A welt sewing machine having, in combination, feeding and stitch forming devices including a needle for sewing a welt to a shoe, a welt guide having a portion substantially surrounding the welt arranged to engage with and guide the welt adjacent the sewing point, a feed finger having a feeding movement to engage and pass with the leading end of the welt through and beyond said guide to position the welt for the formation of the first stitch on a new shoe, and means rendered operative upon stopping the machine for actuating said feed finger.

4. A welt sewing machine having, in combination, feeding and stitch forming devices including a needle for sewing a welt to a shoe, a welt guide comprising a loop through which the welt is passed to position the welt adjacent the sewing point, means for severing the welt between the guide and the sewing point, a welt feeding device comprising a member movable in a plane approaching the plane of movement of the welt in said guide, and a feed finger pivotally supported on said member and having a thrust feeding movement to engage and pass with the leading end of the severed welt through said guide loop.

5. A welt sewing machine having, in combination, feeding and stitch forming devices including a needle for sewing a welt to a shoe, a welt guide comprising a loop through which the welt is passed to position the welt adjacent the sewing point, means for severing the welt between the guide and the sewing point, a welt feeding device comprising a member movable in a plane approaching the plane of movement of the welt in said guide, a feed finger pivotally supported on said member and having a thrust feeding movement to engage and pass with the leading end of the severed welt through said guide loop, and means tending to maintain said finger in a straightened position parallel to the plane of movement of said member.

6. A welt sewing machine having, in combination, feeding and stitch forming devices including a needle for sewing a welt to a shoe, a welt guide comprising a portion substantially surrounding the welt to engage with and guide the welt adjacent the sewing point and having formed therein a slot extending in the direction of feed, a welt feeding finger arranged to extend within said slot to engage a portion of the welt within the welt guide, and means for advancing said finger to engage and pass with the welt through and beyond said welt guide to position the leading end of the welt in the path of the needle.

7. A welt sewing machine, having, in combination, feeding and stitch forming devices including a needle for sewing a welt to a shoe, a welt guide having a portion substantially surrounding the welt arranged to engage with and guide the welt adjacent the sewing point, a feed finger having a feeding movement to engage and pass with the leading end of the welt through and beyond said guide, a welt cutting knife arranged to operate in advance of said welt guide to sever the welt, means for positively advancing and retracting said knife, and means acting when rendered operative for actuating said knife to sever the welt and thereafter for causing said feed finger to advance the leading end of the welt into position for the start of a new operation.

8. A welt sewing machine having, in combination, feeding and stitch forming devices including a needle for sewing a welt to a shoe, a welt guide through which the welt is passed to position the welt adjacent the sewing point, a welt knife arranged to sever the welt between the guide and the sewing point, a feed finger having a feeding movement to engage and pass with the leading end of the severed welt through and beyond said guide, and means acting when rendered operative to advance and retract said knife to sever the welt and thereafter to advance said feed finger to position the leading end of the severed welt in the path of the needle.

9. A welt sewing machine having, in combination, stitch forming and shoe feeding devices including a needle for sewing the welt to a shoe, a welt gripper arranged to feed the leading end of the welt with the shoe during the formation of an initial stitch, and means for actuating said gripper arranged to cause said gripper to position the leading end of the welt in advance of the finally desired position on the shoe prior to the formation of a second stitch.

10. A welt sewing machine having, in combination, stitch forming devices including a needle for sewing the welt to a shoe, feeding devices including means for imparting feeding movements to the needle, a welt gripper arranged to feed the leading end of the welt during the formation of an initial stitch, and means for actuating said gripper to position the leading end of the welt in advance of the finally desired position on the shoe prior to the formation of a second stitch.

11. A welt sewing machine having, in combination, stitch forming devices including a needle for sewing the welt to a shoe, feeding devices including means for imparting feeding movements to the needle, a welt gripper arranged to feed the leading end of the welt during the formation of an initial stitch, means for actuating said gripper to position the leading end of the welt in advance of the finally desired position on the shoe prior to the formation of a second stitch, and means acting thereafter to disengage the gripper from the welt.

12. A welt sewing machine having, in combination, stitch forming devices including a needle for sewing the welt to a shoe, means for imparting a continuous feed to the shoe including means for reciprocating the needle in the line of feed, a welt gripper arranged to feed the leading end of the welt with the shoe during the formation of the initial stitch, and means for actuating said gripper arranged to locate the leading end of the welt in advance of the finally desired position on the shoe subsequent to the withdrawal of the needle from the work.

13. A welt sewing machine having, in combination, stitch forming devices including a needle for sewing the welt to a shoe, a welt guide, a shoe supporting jack, means for imparting positioning and feeding movements to the jack and shoe supported thereon to transfer the point of operation around the shoe, a welt gripper arranged to advance the leading end of the welt with the shoe during the formation of an initial stitch, and means for actuating said gripper to locate the leading end of the welt in advance of the finally desired position on the shoe subsequent to the withdrawal of the needle from the work.

14. A welt sewing machine having, in combination, stitch forming devices including a needle for sewing the welt to a shoe, feeding devices for imparting a continuous feed to said shoe including a needle feed cam and connections for imparting a reciprocating movement to the needle in the line of feed, a welt gripper arranged to advance the leading end of the welt with the shoe during the formation of an initial stitch, means actuated from the needle feed cam for imparting said feeding movement to the gripper, said cam being formed to increase the feeding rate of the gripper subsequent to the withdrawal of the needle from the work and prior to the back feeding movement thereof to locate the welt on the shoe in advance of the finally desired position.

15. A welt sewing machine having, in combination, stitch forming devices including a needle for sewing the welt to the shoe, a welt guide, a shoe supporting jack, means for imparting positioning and feeding movements to the jack and shoe supported thereon to transfer the point of operation around the shoe, means including a needle feed cam and connections for reciprocating the needle in the line of feed, a welt gripper arranged to advance the leading end of the welt with the shoe during the formation of the initial stitch, means actuated from the needle feed cam for imparting said feeding movement to the gripper, said cam being formed to increase the feeding rate of the gripper subsequent to the withdrawal of the needle from the work and prior to the back feeding movement thereof to locate the welt on the shoe in advance of the finally desired position.

16. A welt sewing machine having, in combination, feeding and stitch forming devices including a needle for sewing a welt to the shoe, a welt guide having a portion substantially surrounding the welt to engage and guide the welt adjacent the sewing point, a welt feeding finger, a welt severing knife arranged to sever the welt between the guide and the needle, a welt gripper arranged to engage the severed end of the welt beyond the sewing point, and means rendered operative in stopping the machine to cause said knife to sever the welt, to actuate said finger to advance the leading end of the welt beyond the sewing point, and to actuate said gripper to engage the welt.

17. A welt sewing machine having, in combination, feeding and stitch forming devices including a needle for sewing a welt to the shoe, a welt guide having a portion substantially surrounding the welt to engage with and guide the welt adjacent the sewing point, a welt feeding finger, a welt severing knife arranged to sever the welt between the guide and the needle, a welt gripper arranged to engage the severed end of the welt beyond the sewing point, means rendered operative in stopping the machine to cause said knife to sever the welt, to actuate said finger to advance the leading end of the welt beyond the sewing point, and to actuate said gripper to engage the welt, and means for feeding said gripper during the formation of an initial stitch on a new shoe to advance the welt with the shoe.

18. A welt sewing machine having, in combination, feeding and stitch forming devices including a needle for sewing a welt to the shoe, a welt guide having a substantially closed portion substantially surrounding the welt to engage with and guide the welt adjacent the sewing point, a welt feeding finger, a welt severing knife arranged to sever the welt between the guide and the needle, a welt gripper arranged to engage the severed end of the welt beyond the sewing point, means rendered operative in stopping the machine to cause said knife to sever the welt, to actuate said finger to advance the leading end of the welt beyond the sewing point, and to actuate said gripper to engage the welt, and means for feeding said gripper during the formation of an initial stitch on a new shoe to position the leading end of the welt in advance of the finally desired position on the shoe prior to the formation of the second stitch.

19. A welt sewing machine having, in combination, stitch forming devices including a needle for sewing a welt to the shoe, a welt guide, a shoe supporting jack, means for imparting positioning and feeding movements to the jack and shoe supported thereon to transfer the point of operation about the shoe, a welt severing knife to sever the welt between the needle and said guide, a welt feeding finger, a welt gripper to engage the leading end of the welt beyond the sewing point, means rendered operative in stopping the machine to cause said knife to sever the welt, to advance said feed finger to feed the welt beyond said sewing point and to actuate the gripper to engage the welt, and means for feeding said gripper to locate the leading end thereof in advance of the finally desired position on the shoe prior to the formation of the second stitch.

20. A sewing machine having, in combination, stitch forming devices including a hook needle, a looper, a thread finger pivoted for oscillatory movements to cooperate with the looper and needle in the formation of a stitch, a thread gripper member pivoted to cooperate with the finger to grip the thread, a thread cutting knife, a slide on which the knife is mounted to engage and cut an unsupported portion of the thread stretched between the gripper and work, and mechanism rendered operative upon stopping the machine to impart an abnormal movement to the thread finger to engage the thread between the finger and gripper member and thereafter to advance the slide and knife mounted thereon to sever the thread.

21. A sewing machine having, in combination, stitch forming devices including a hook needle, a looper, a thread finger pivoted for oscillatory movement to cooperate with the looper and needle in the formation of a stitch, a thread gripper member pivoted to cooperate with the finger to grip the thread, a thread cutting knife, a slide on which the knife is mounted to impart a forward and upward thrust thereto to engage an unsupported portion of the thread stretched between the work and the gripper, mechanism rendered operative upon stopping the machine to impart an abnormal movement to the thread finger to engage the thread between the finger and gripper member, and thereafter to advance the slide and knife mounted thereon to sever the thread.

ALFRED R. MORRILL.